(12) United States Patent
Ly et al.

(10) Patent No.: US 12,073,073 B2
(45) Date of Patent: Aug. 27, 2024

(54) DEVICE, METHOD, AND GRAPHICAL USER INTERFACE FOR PROVIDING HEALTH COACHING AND FITNESS TRAINING SERVICES

(71) Applicant: Skimble, Inc., San Francisclo, CA (US)

(72) Inventors: Maria Ck Ly, San Francisco, CA (US); Gabriel J. Vanrenen, San Francisco, CA (US)

(73) Assignee: SKIMBLE, INC., San Francisco, CA (US)

( * ) Notice: Subject to any disclaimer, the term of this patent is extended or adjusted under 35 U.S.C. 154(b) by 157 days.

(21) Appl. No.: 14/566,559

(22) Filed: Dec. 10, 2014

(65) Prior Publication Data

US 2015/0185967 A1 Jul. 2, 2015

Related U.S. Application Data

(60) Provisional application No. 61/922,720, filed on Dec. 31, 2013.

(51) Int. Cl.
*G06F 3/048* (2013.01)
*G06F 3/0488* (2022.01)

(52) U.S. Cl.
CPC .................. *G06F 3/0488* (2013.01)

(58) Field of Classification Search
CPC .............. G06F 3/0488; H04N 21/4312; H04N 69/329; H04N 5/2627
See application file for complete search history.

(56) References Cited

U.S. PATENT DOCUMENTS

| | | | | |
|---|---|---|---|---|
| 2002/0115047 A1* | 8/2002 | McNitt | .............. | A63B 24/0003 424/252 |
| 2007/0088709 A1* | 4/2007 | Bailey | .................. | H04N 5/2627 |
| 2009/0009605 A1* | 1/2009 | Ortiz | ..................... | H04L 69/329 348/157 |
| 2009/0024923 A1* | 1/2009 | Hartwig | ............ | G06F 17/30781 715/16 |

(Continued)

OTHER PUBLICATIONS

AppJudgment, "Get In Shape With Your New Personal Trainer App: Skimble!," May 3, 2011, https://www.youtube.com/watch?v=C3ThVq_aKtk, 9 pages.*

(Continued)

*Primary Examiner* — Haoshian Shih
(74) *Attorney, Agent, or Firm* — Chang & Hale LLP

(57) ABSTRACT

A method is disclosed for providing personal training services, at a portable electronic device having a touch screen display, comprising displaying a user interface comprising a first region and a second region, where the first region is configured to display still images or videos and the second region comprises one or more timers. The method further includes displaying, in the first region of the user interface, a plurality of synchronized video panels and conveying audible information in synchronicity with the one or more timers. The method further includes, in response to detecting a first gesture on the touch screen display, while displaying the plurality of synchronized video panels, displaying, in the first region of the user interface, a first video panel of the plurality of synchronized video panels.

29 Claims, 28 Drawing Sheets

(56) References Cited

U.S. PATENT DOCUMENTS

| | | | | |
|---|---|---|---|---|
| 2009/0291805 | A1* | 11/2009 | Blum | A63B 6/00 |
| | | | | 482/9 |
| 2012/0183940 | A1* | 7/2012 | Aragones | G06F 19/3481 |
| | | | | 424/247 |
| 2012/0221449 | A1* | 8/2012 | Kief | G06F 17/2241 |
| | | | | 705/34 |
| 2012/0277891 | A1* | 11/2012 | Aragones | G06F 19/3481 |
| | | | | 700/91 |
| 2016/0162244 | A1* | 6/2016 | Christmas | H04N 21/4312 |
| | | | | 345/1.3 |

OTHER PUBLICATIONS

AppJudgment, "Get In Shape With Your New Personal Trainer App: Skimblel," May 30, 2011, https://www.youtube.com/watch?v=C3ThVq_aKtk, 15 pages (Year: 2011).*

AppJudgment, "Get In Shape With Your New Personal Trainer App: Skimblel," May 30, 2011, https://www.youtube.com/watch?v=C3ThVq_aKtk, 19 pages (Year: 2011).*

Nike (Women's) Training Club, http://www.nike.com/us/en_us/c/womens-training/apps/nike-training-club, downloaded Jun. 12, 2015, 8 pgs.

BeachBody, Introducing the P90X App for iPhone and Android, http://www.beachbody.com/product/fitness_programs/official-fitness-workout-p90x-app-for-iphone.do, downloaded Jun. 12, 2015, 2 pgs.

Jillian Micaels, The App, New Features, http://www.jillianmichaels.com/fit/mobile-tools-app-iphone, downloaded Jun. 12, 2015, 7 pgs.

Google Play, Rodale, https://play.google.com/store/apps/developer?id=Rodale&hl=en, downloaded Jun. 12, 2015, 2 pgs.

Women'sHealth, Awesome APPS, Women's Health Workouts, http://www.womenshealthmag.com/fitness/wh-workouts-for-iphone, downloaded Jun. 12, 2015, 3 pgs.

Men'sHealth, Real Results. Record Time., Men's Health Workouts, http://www.menshealth.com/events-promotions/workouts-app, downloaded Jun. 12, 2015, 5 pgs.

POPSUGAR Active, iTunes Preview, iTunes is the world's easiest way to organize and add to our digital media collection, https://itunes.apple.com/us/app/popsugar-active/id684484023?mt=8, downloaded Jun. 12, 2015, 2 pgs.

Chatelaine 10-Minute Fitness, by Rogers Publishing Limited, iTunes Preview, iTunes is the world's easiest way to organize and add to your digital media collection, https://itunes.apple.com/us/app/chatelaine-10-minute-fitness/id643853756?mt=8, downloaded Jun. 12, 2015, 2 pgs.

* cited by examiner

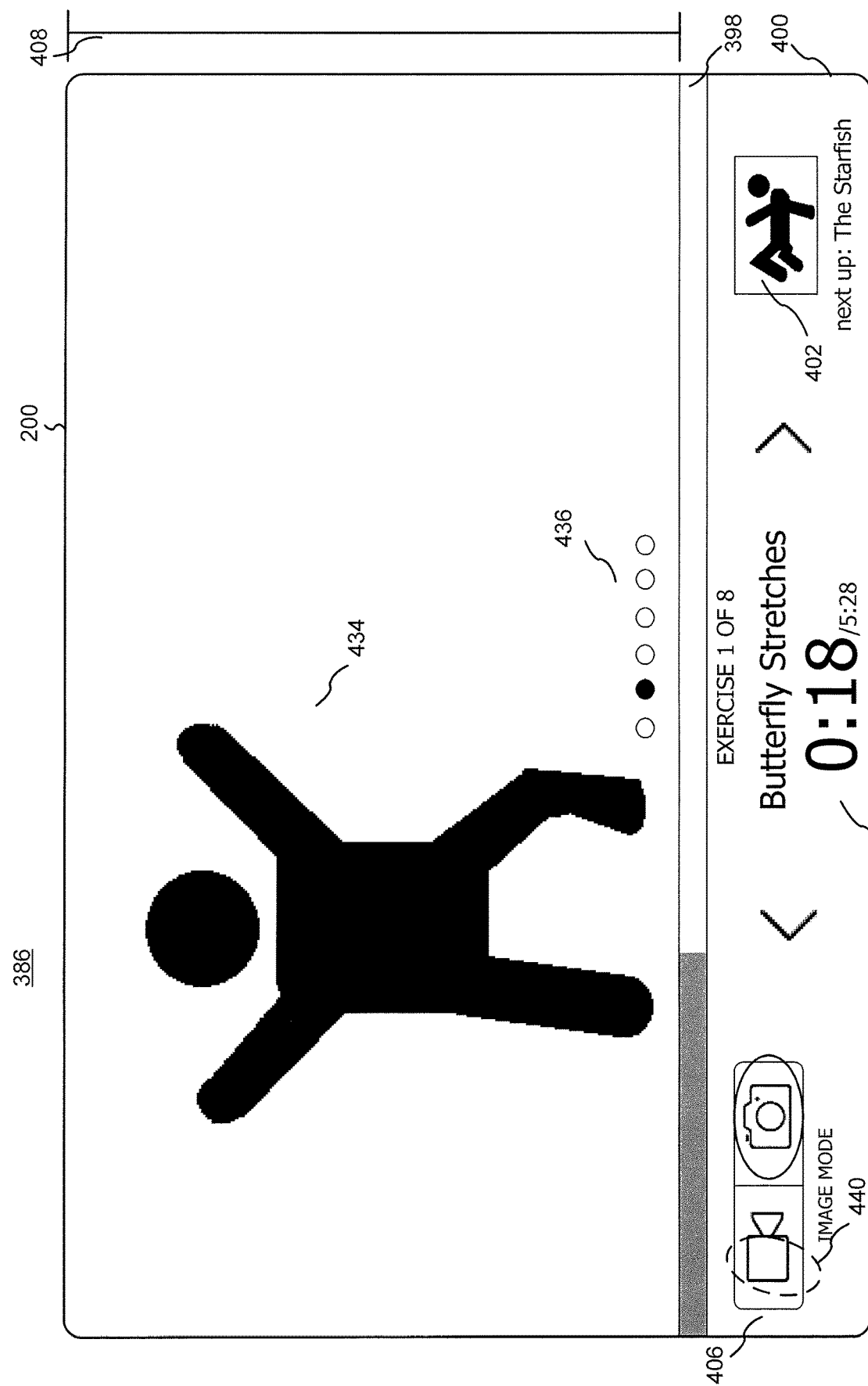

Figure 3T

DEVICE, METHOD, AND GRAPHICAL USER INTERFACE FOR PROVIDING HEALTH COACHING AND FITNESS TRAINING SERVICES

RELATED APPLICATION

This application claims priority to U.S. Provisional Patent Application Ser. No. 61/922,720, filed Dec. 31, 2013, entitled "Device, Method, and Graphical User Interface for Providing Health Coaching and Fitness Training Services," which is herein incorporated by reference in its entirety.

TECHNICAL FIELD

The disclosed embodiments relate generally to portable electronic devices, and more particularly, to portable electronic devices that provide health coaching and fitness training services through graphical user interfaces.

BACKGROUND

Many users of portable electronic devices lead busy lives, where it is difficult to find time for sessions with a live trainer at a gym, or with a health coach. This poses several difficulties, as personal trainers and coaches provide guidance, motivation and consistency to exercise safely and regularly.

Several programs and applications for portable electronic devices have been created to provide exercise training to users at their time and place of convenience. Many of these programs display stationary images of exercise poses and postures, along with text-based or audio-based instructions. Some programs offer video playback of a subject performing the particular exercise, from a single vantage point and only for a limited period of time (e.g., for a single exercise). Unfortunately, these programs do not come very close to the level of instruction expected from a personal training session with a live trainer.

As portable electronic devices become more compact, and the number of functions performed by a given device increase, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Accordingly, there is a need for portable electronic devices with more interactive, immersive and intuitive user interfaces for providing health coaching and fitness training services. Such interfaces increase the effectiveness, efficiency and user satisfaction with portable devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, in addition to providing personal training services, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In some embodiments, a device having a touch screen display is configured to display a user interface comprising a first region and a second region, wherein the first region is configured to display still images or videos and the second region comprises one or more timers. In some embodiments, the device is further configured to display, in the first region of the user interface, a plurality of synchronized video panels, and convey audible information in synchronicity with the one or more timers. In some embodiments, the device is further configured to, in response to detecting a first gesture on the touch screen display, while displaying the plurality of synchronized video panels, display in the first region of the user interface, a first video panel of the plurality of synchronized video panels.

In some embodiments, the device is further configured to, in response to detecting a second gesture on the touch screen display, while displaying the first video panel, display in the first region of the user interface, the plurality of synchronized video panels. In some embodiments, the first gesture and the second gesture are of the same type of gesture. In some embodiments, each video panel of the plurality of video panels is focused on a first moving object. In some embodiments, the first moving object is a representation of a personal trainer. In some embodiments, the audible information comprises verbal communication from the personal trainer, while in some embodiments, the audible information comprises cues or tones.

In some embodiments, the device is further configured to, in response to detecting a third gesture on the touch screen display, while displaying the first video panel, display, in the first region of the user interface, a second video panel of the plurality of synchronized video panels. In some embodiments, the progression of the one or more timers in the second region of the user interface remains consistent while display of the first region of the user interface changes. In some embodiments, the device is further configured to, in response to detecting a fourth gesture on the touch screen display, display in the first region of the user interface, one or more still images. In some embodiments, the first region comprises an indicator to indicate which video panel of the plurality of video panels is currently being displayed.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
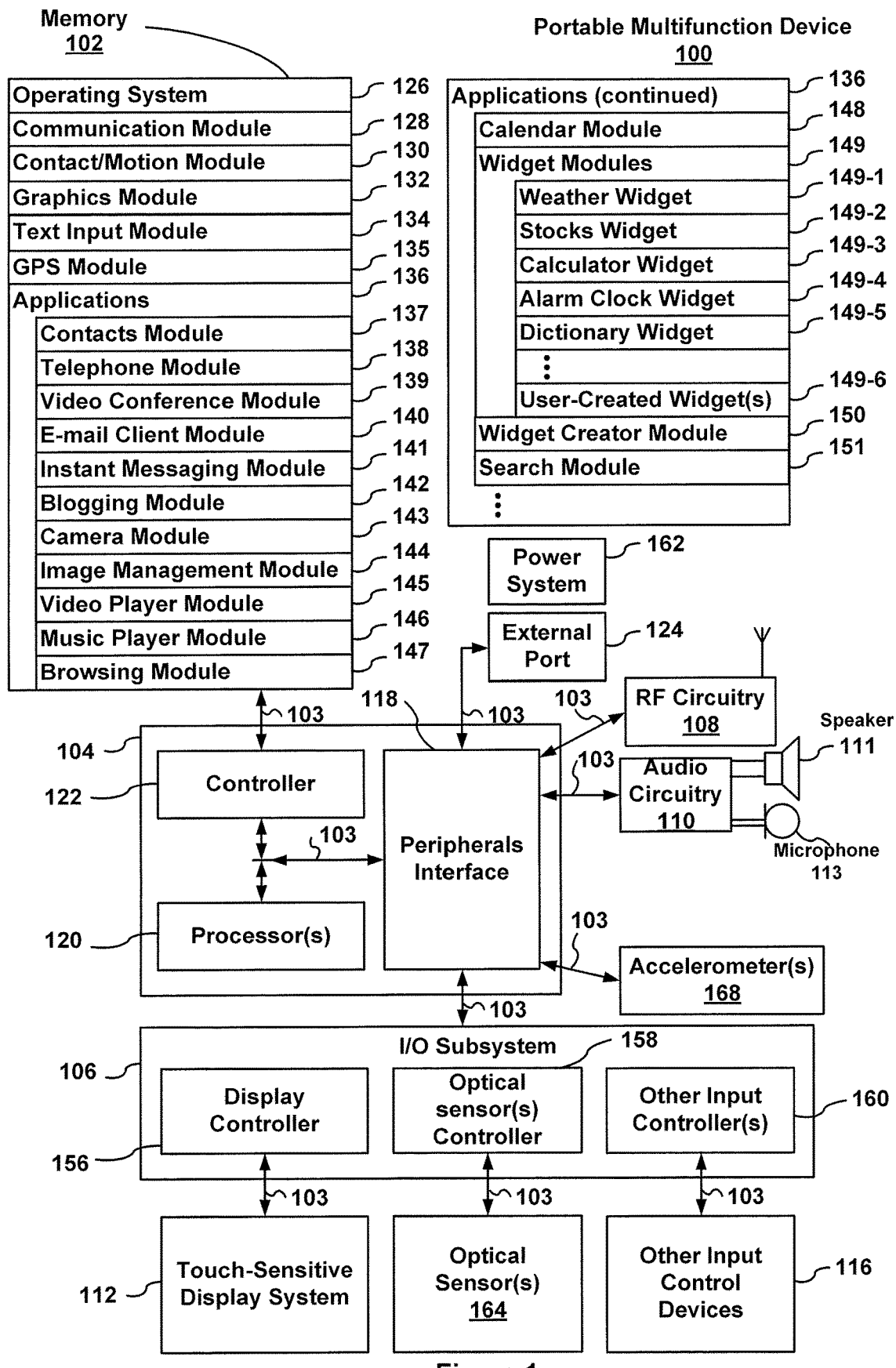
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating portable multifunction device 100 with touch-sensitive display 112 in accordance with some embodiments. The touch-sensitive display 112 is sometimes called a "touch screen" for convenience, and may also be known as or called a touch-sensitive display system. In some embodiments, the device 100 includes a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. In some embodiments, the device 100 includes one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

In some embodiments, memory 102 includes high-speed random access memory and/or non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 are implemented on a single chip, such as a chip 104. In some other embodiments, they are implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. In some embodiments, the RF circuitry 108 includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. In some embodiments, the RF circuitry 108 communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

In some embodiments, the touch screen 112 has a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 includes a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 includes a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semi-transparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the device 100 also includes one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lenses, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more accelerometers 168. FIG. 1 shows an accelerometer 168 coupled to the peripherals interface 118. Alternately, the accelerometer 168 may be coupled to an input controller 160 in the I/O subsystem 106. In some embodiments, information is displayed on the touch screen display in a portrait view or a landscape view based on an analysis of data received from the one or more accelerometers.

In some embodiments, the software components stored in memory 102 include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication. Another exemplary application 136 stored in memory 102, is an application for providing personal training services through a graphical user interface.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Embodiments of user interfaces and associated processes using online video module 155 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
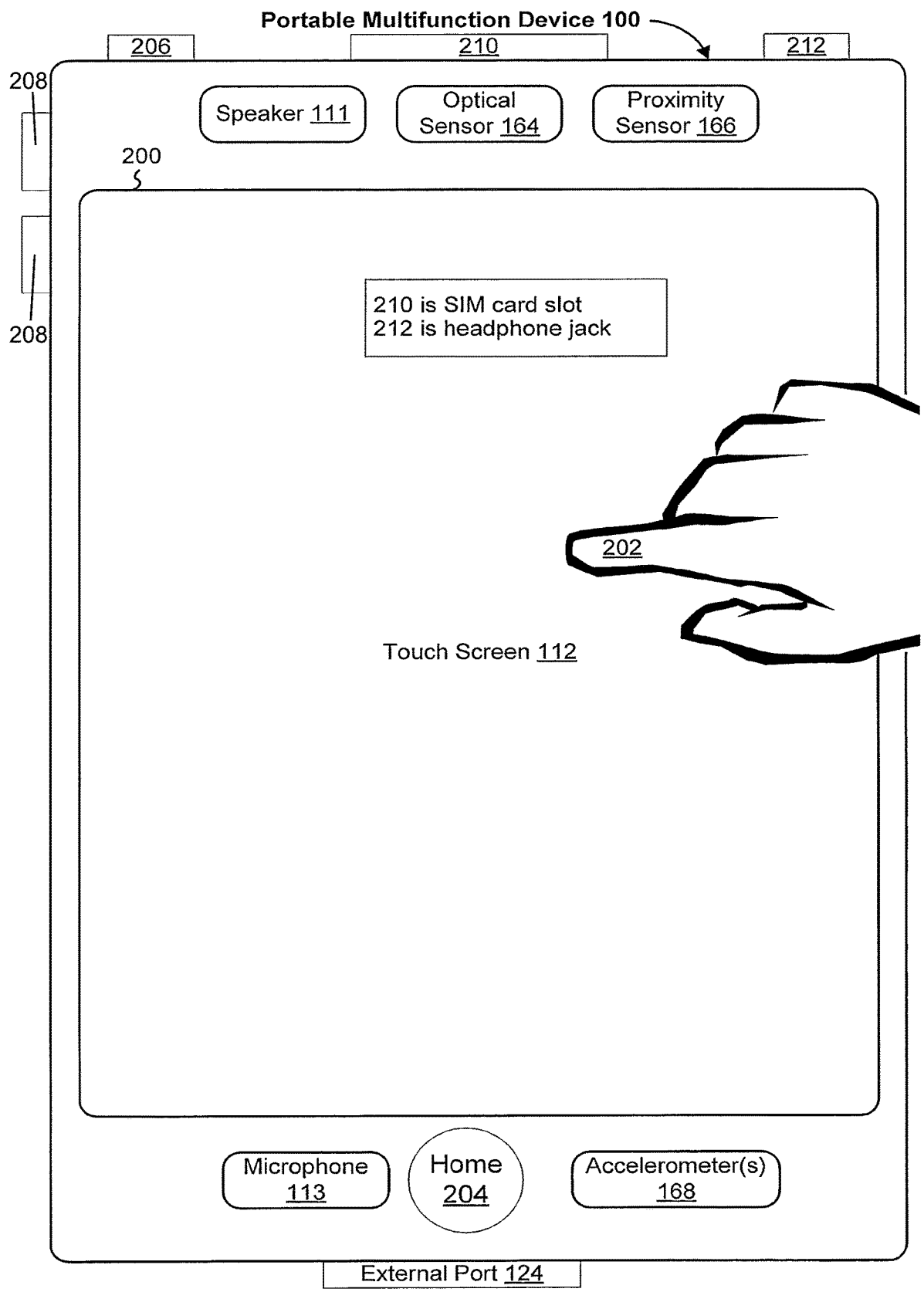
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact includes a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3A:
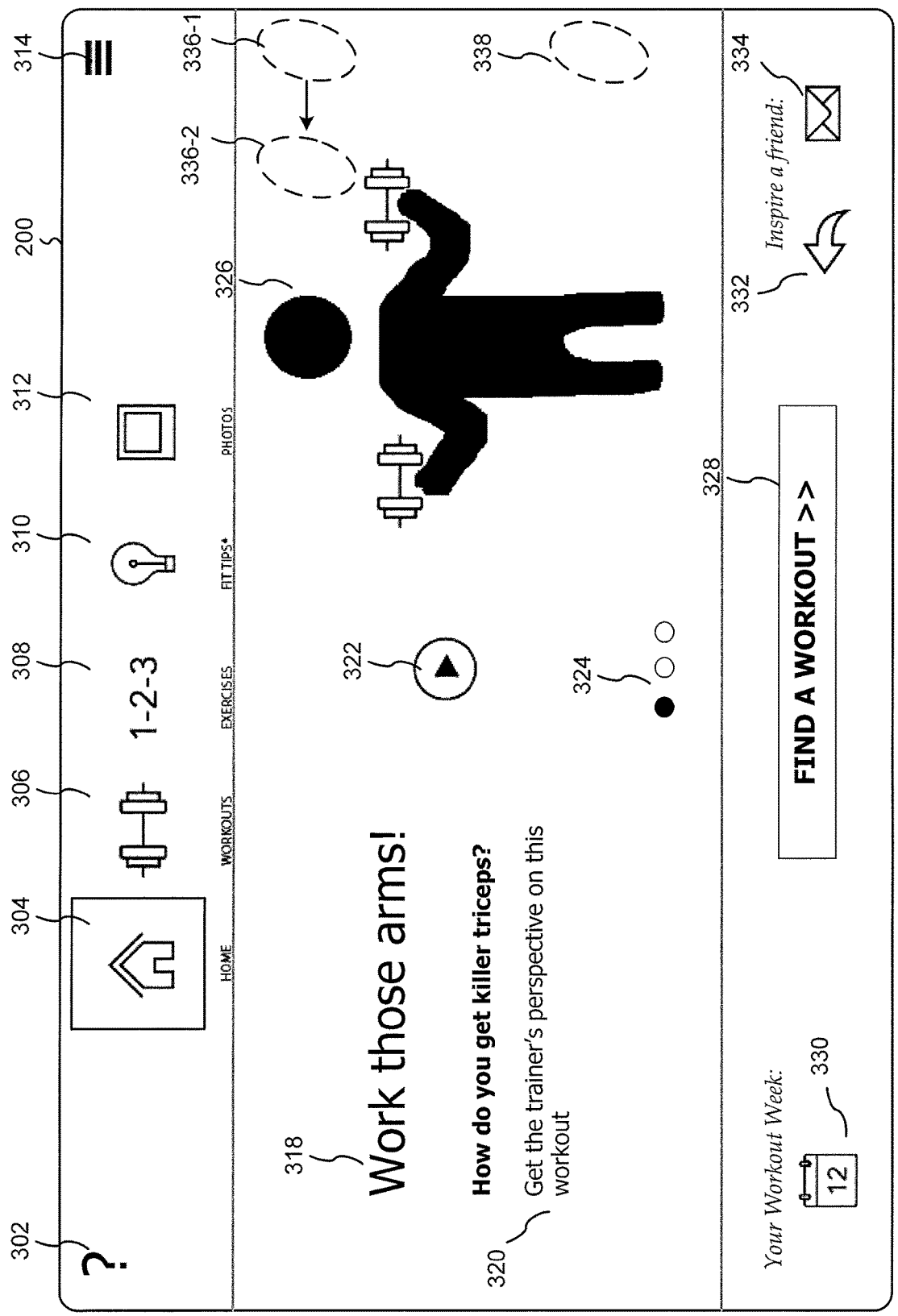
FIGS. 3A-3X illustrate exemplary user interfaces for a personal training application in accordance with some embodiments.
Figure 3B:
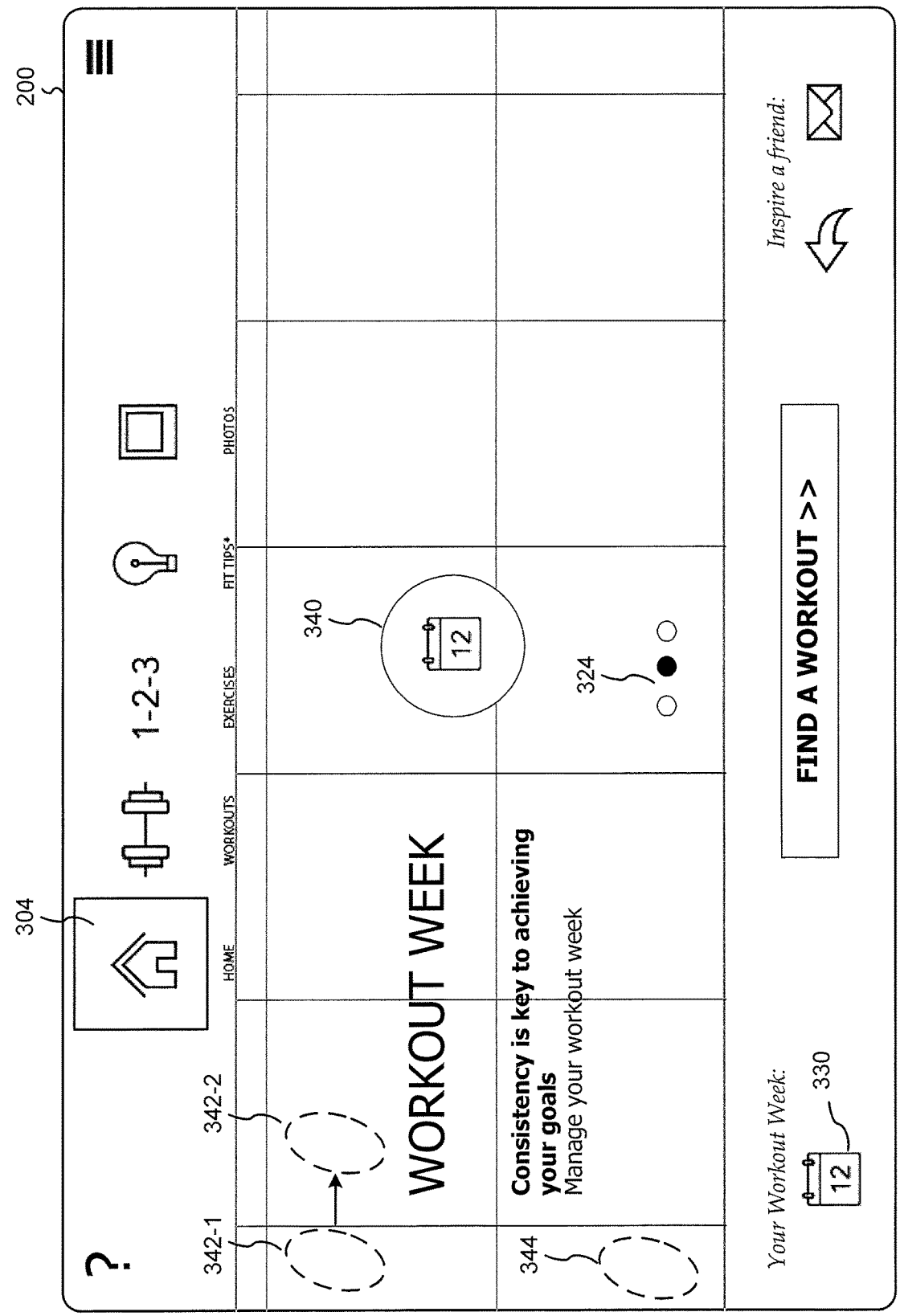
Figure 3C:
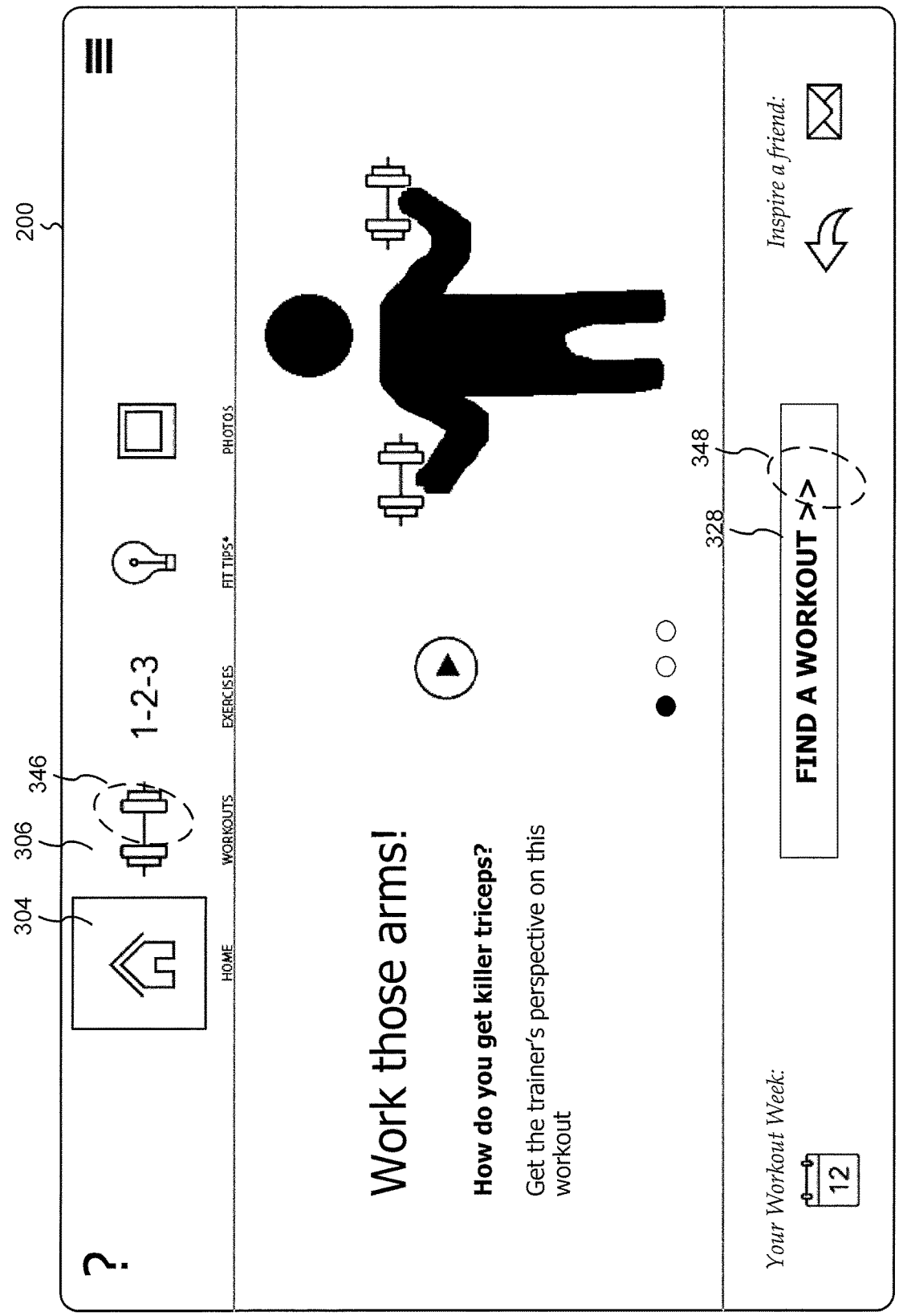
Figure 3D:
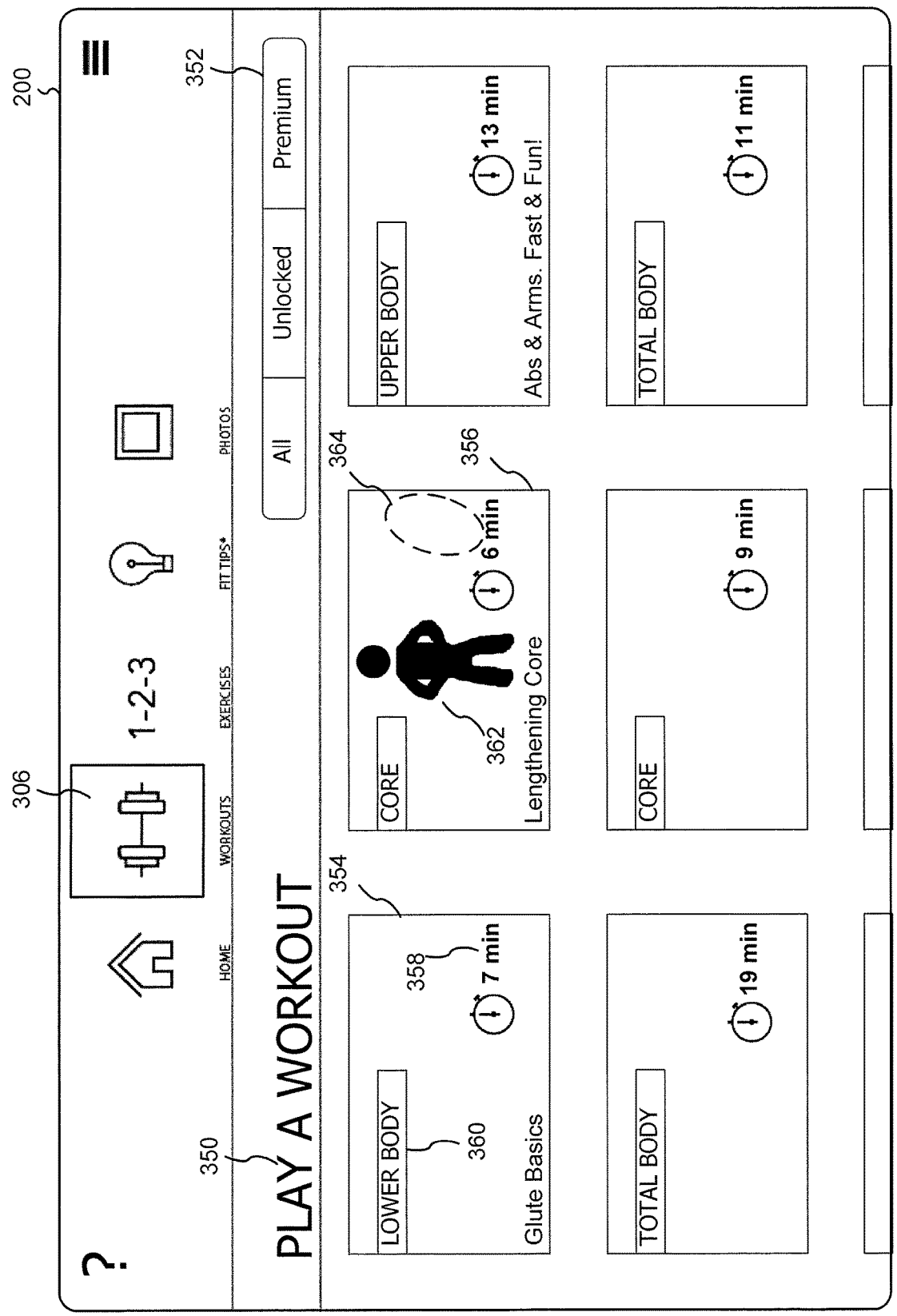
Figure 3E:
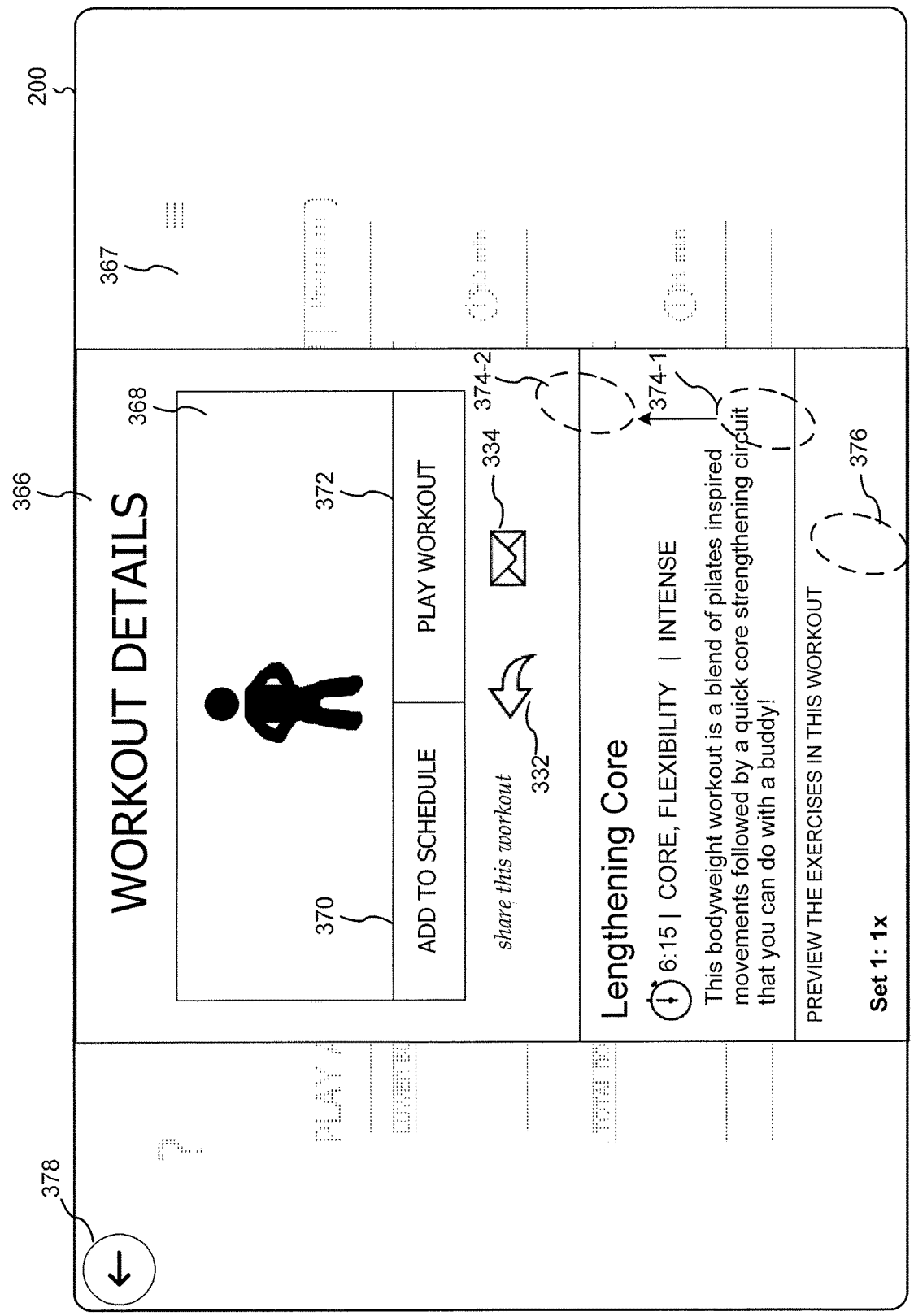
Figure 3F:
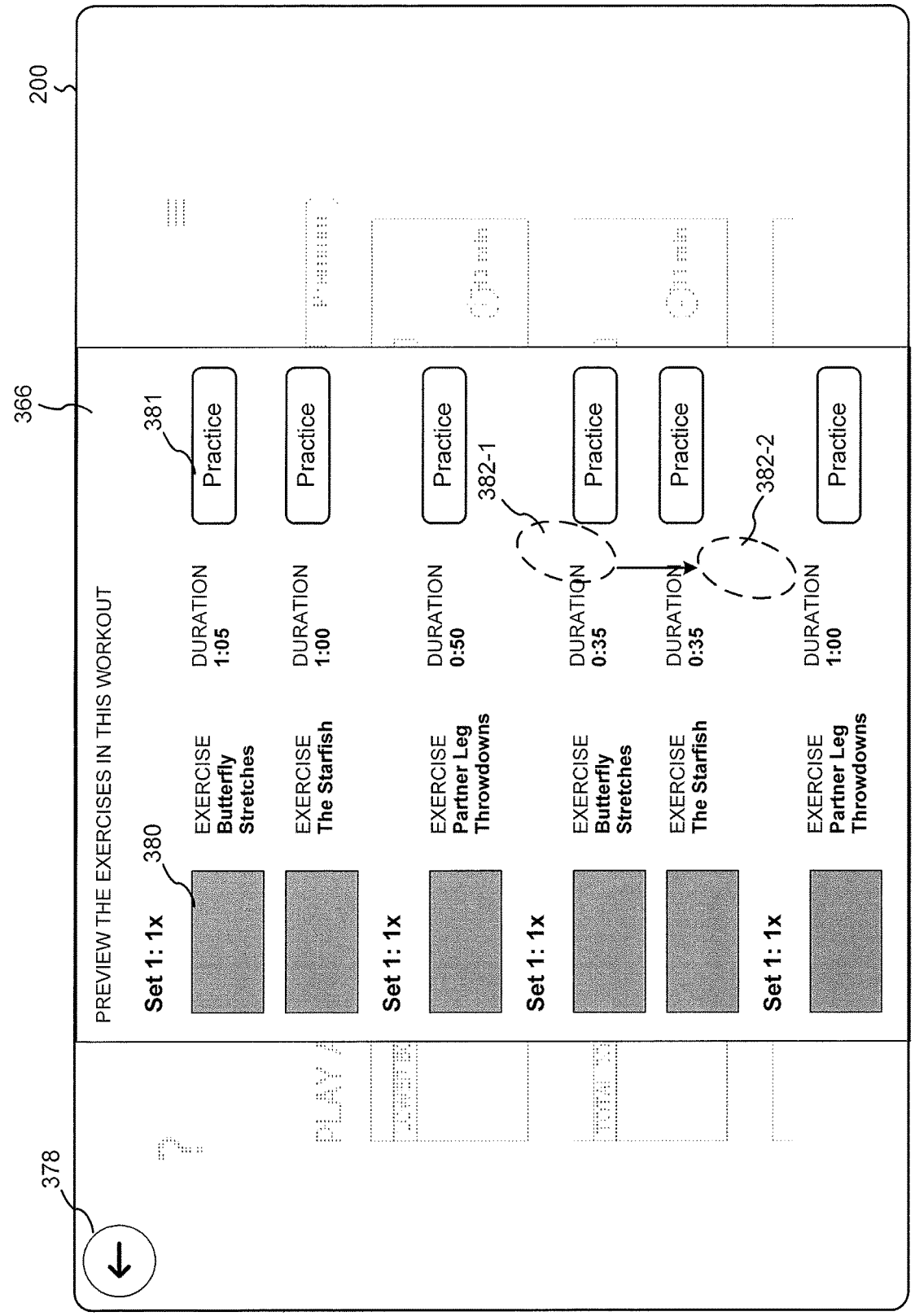
Figure 3G:
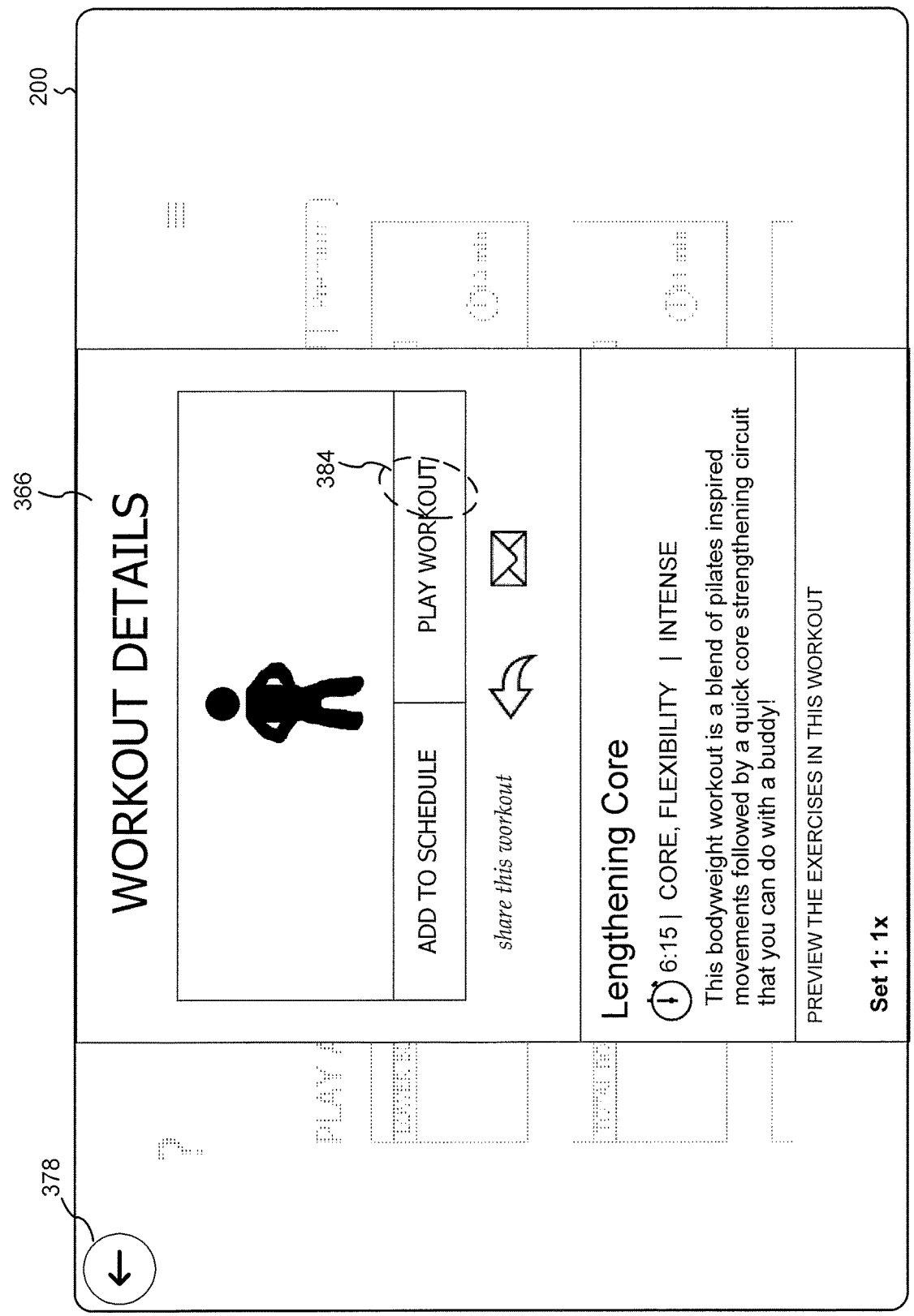
Figure 3H:
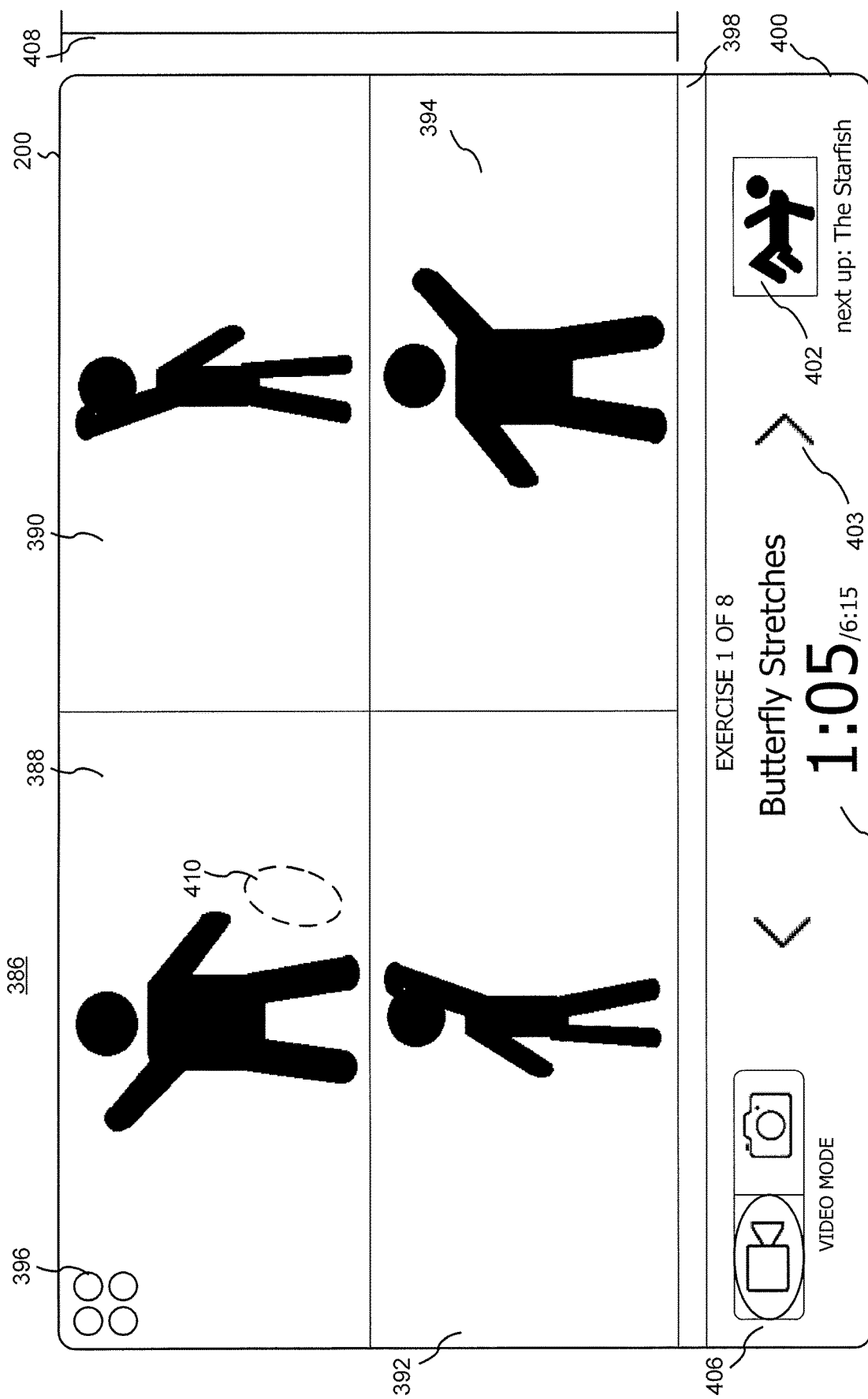
Figure 3I:
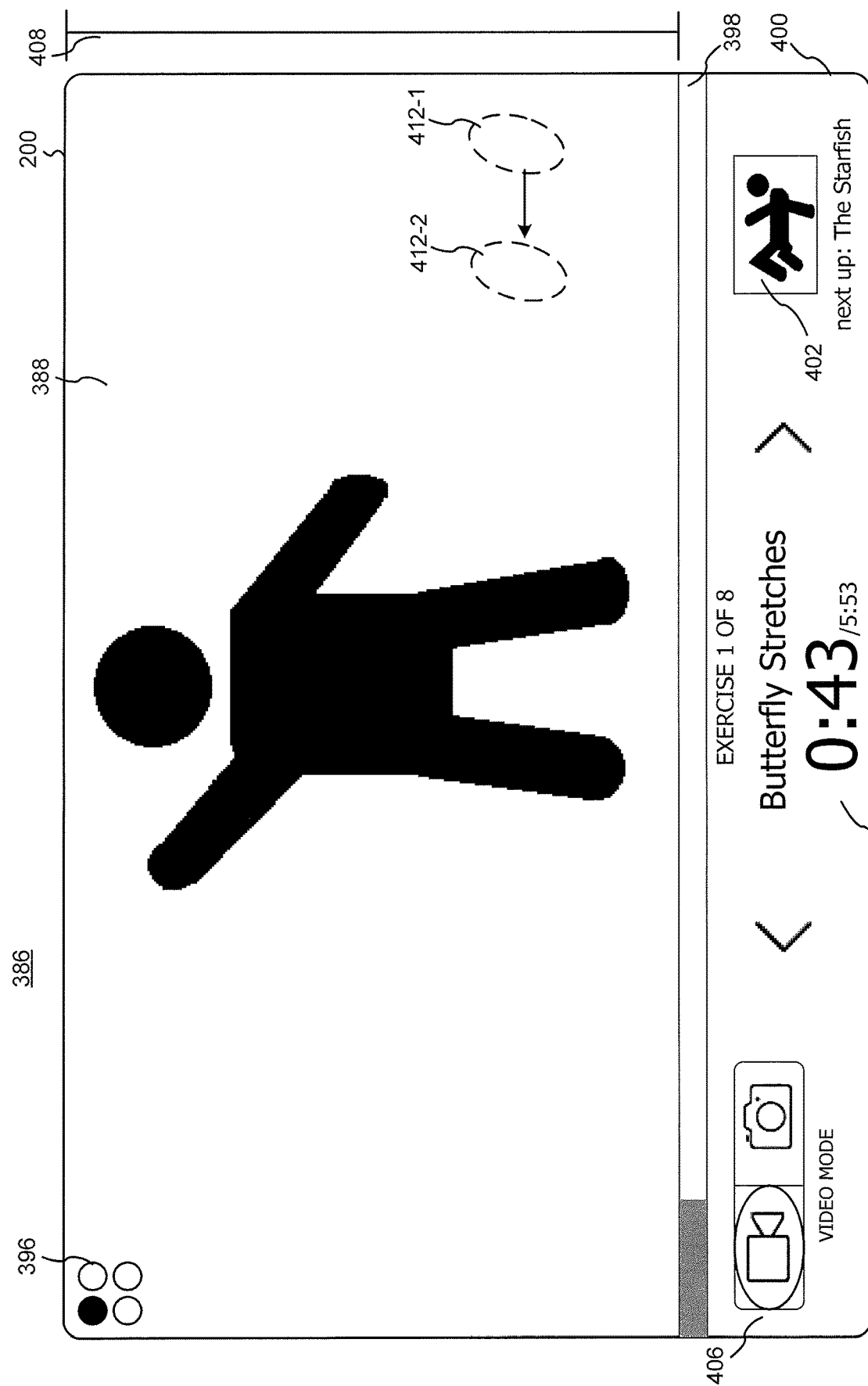
Figure 3J:
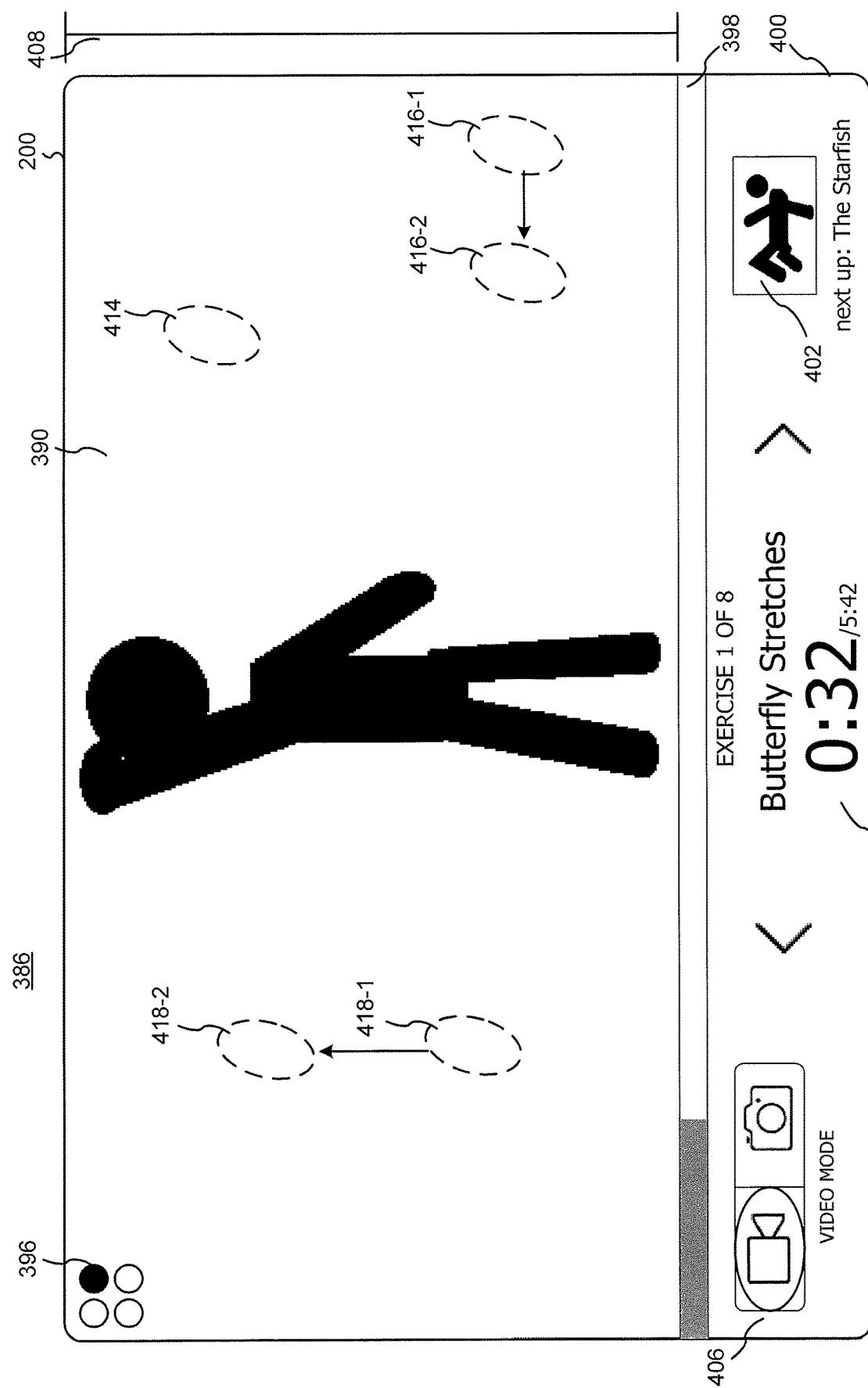
Figure 3K:
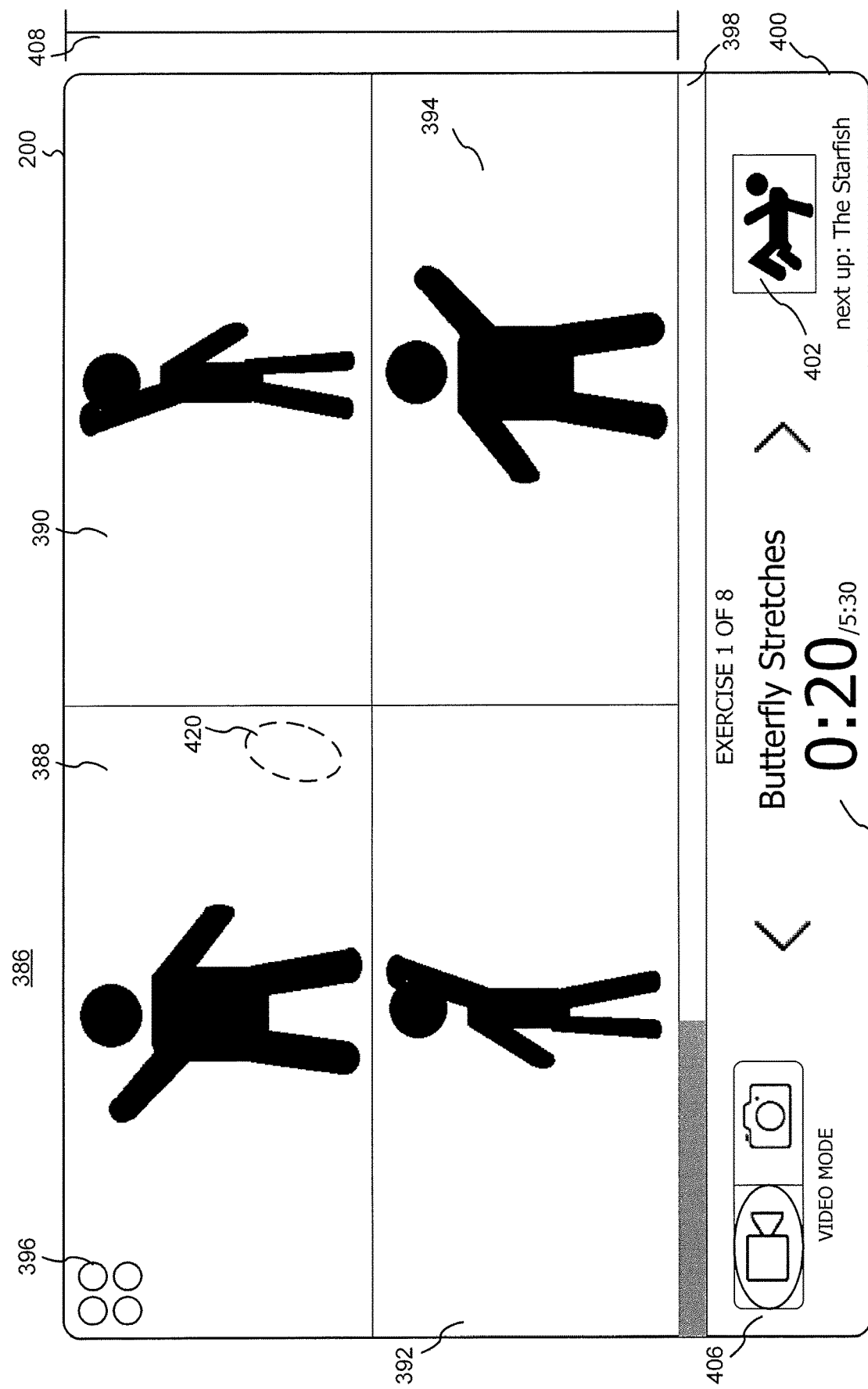
Figure 3L:
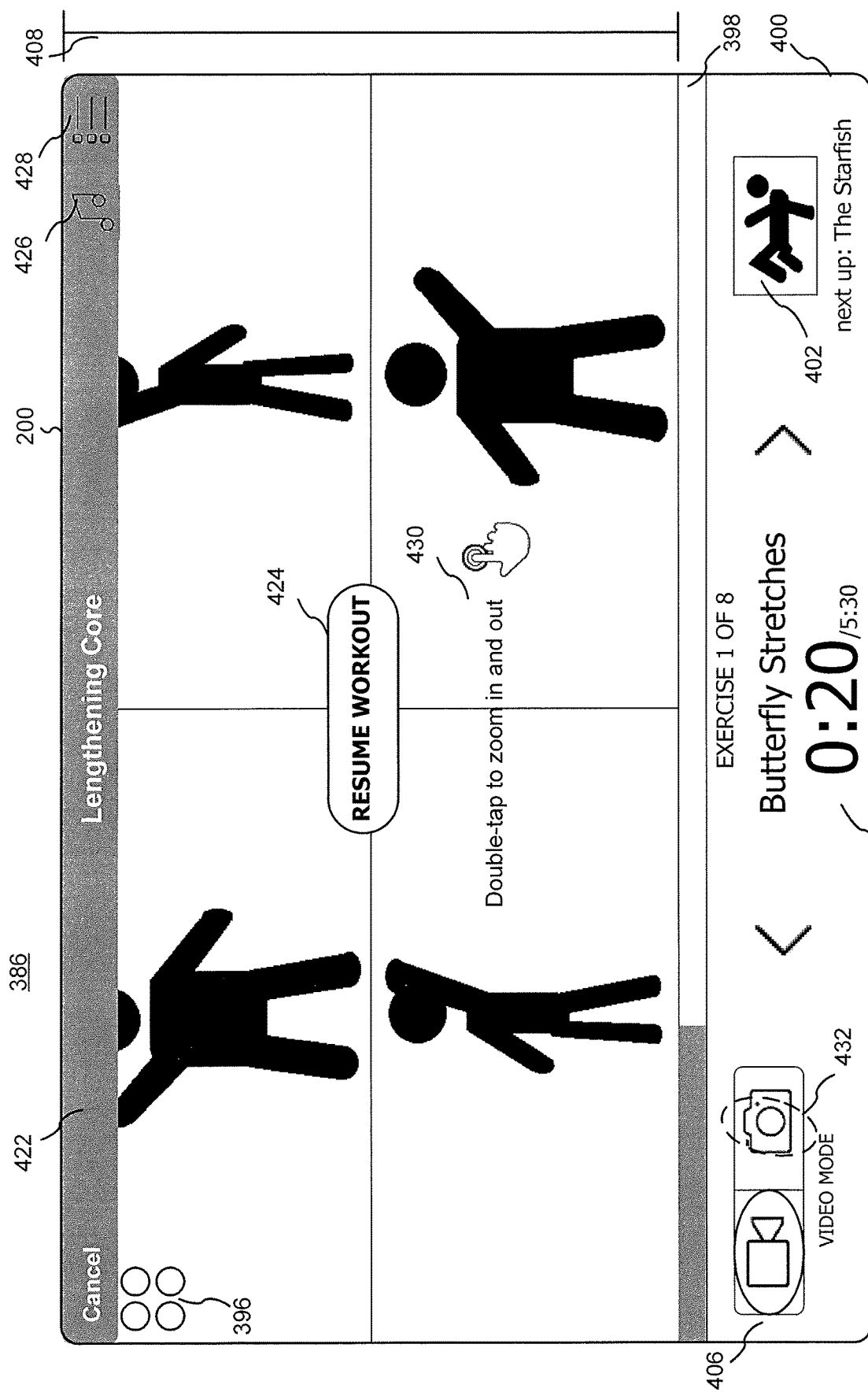
Figure 3M:
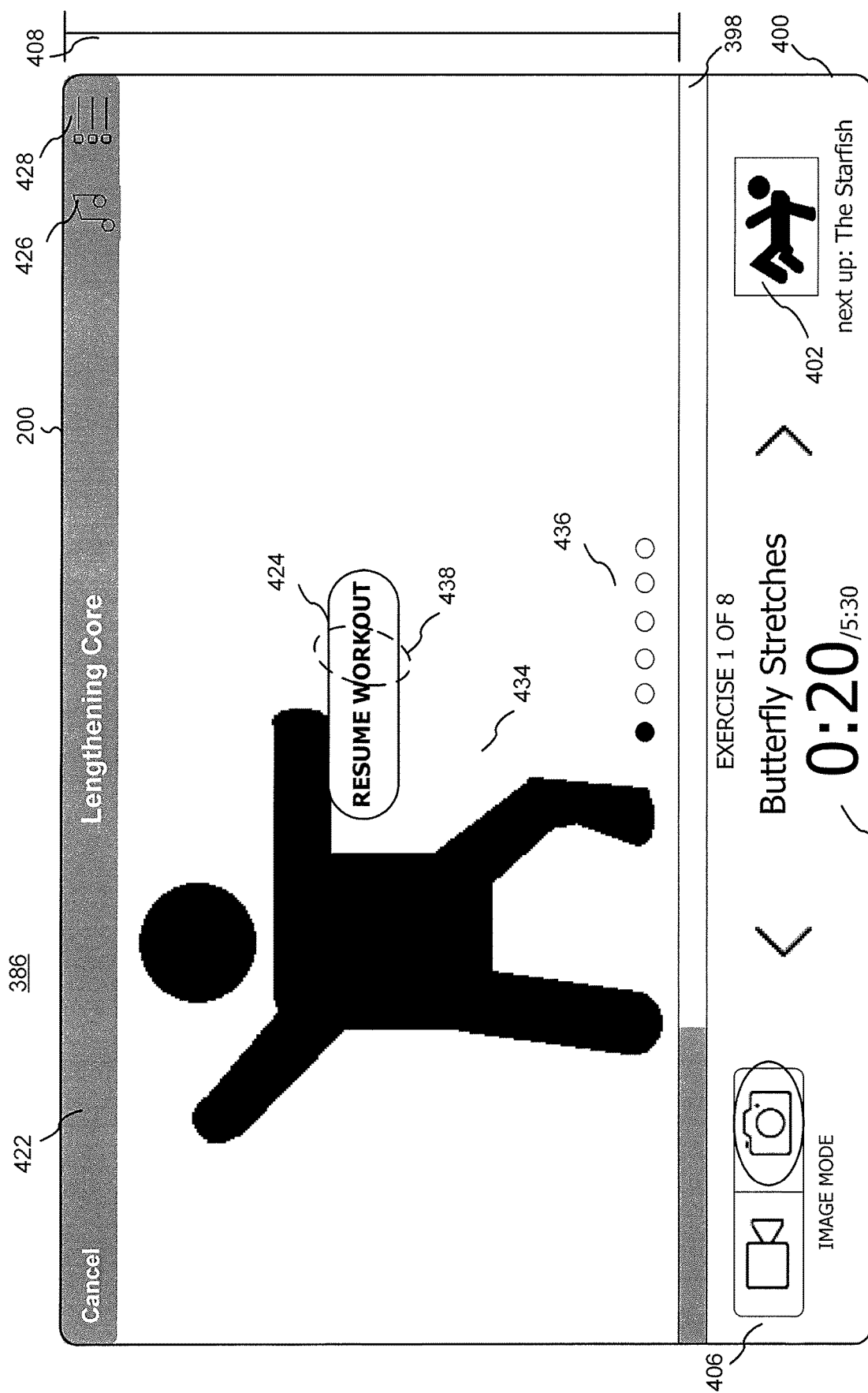
Figure 3O:
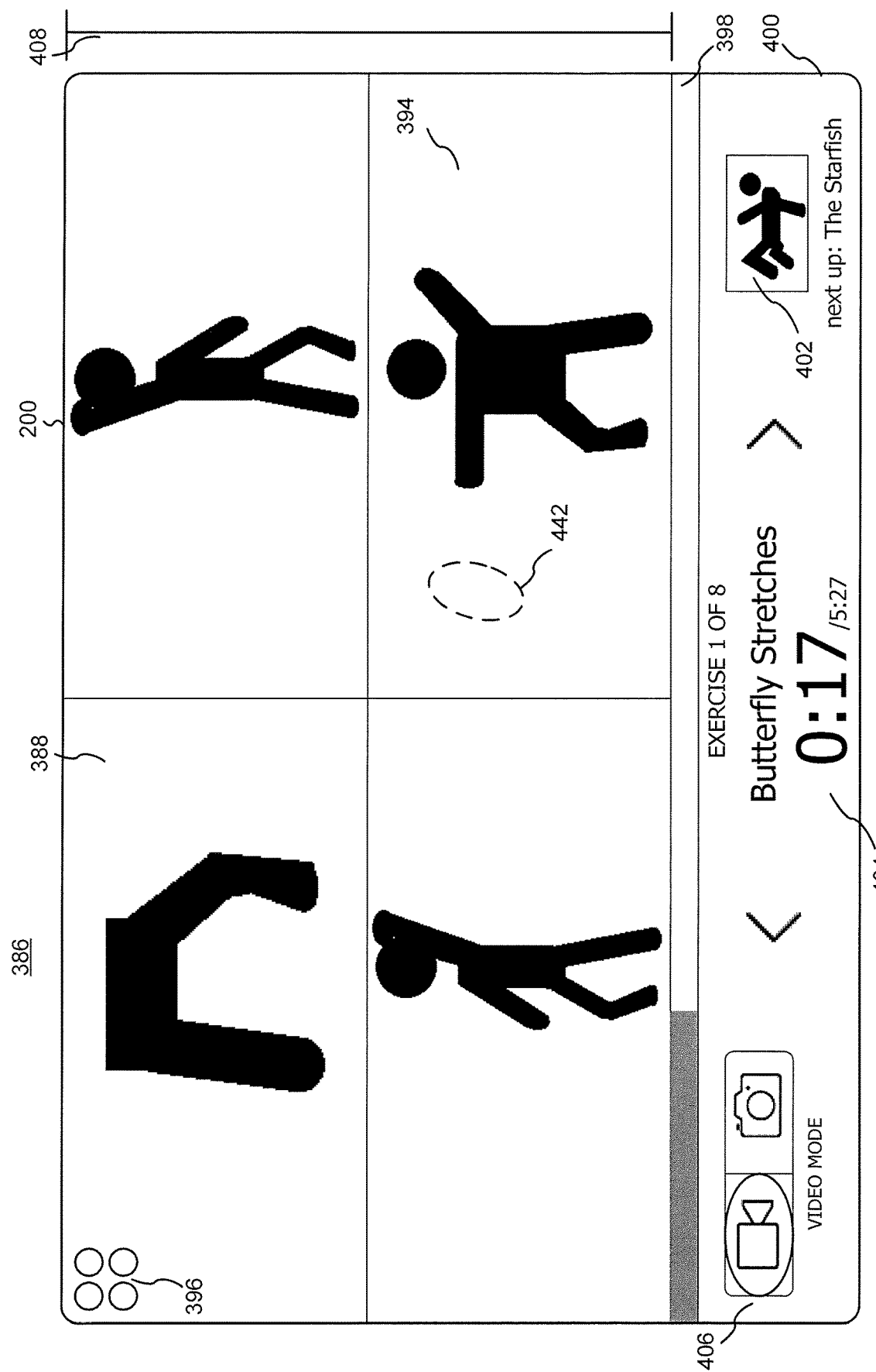
Figure 3P:
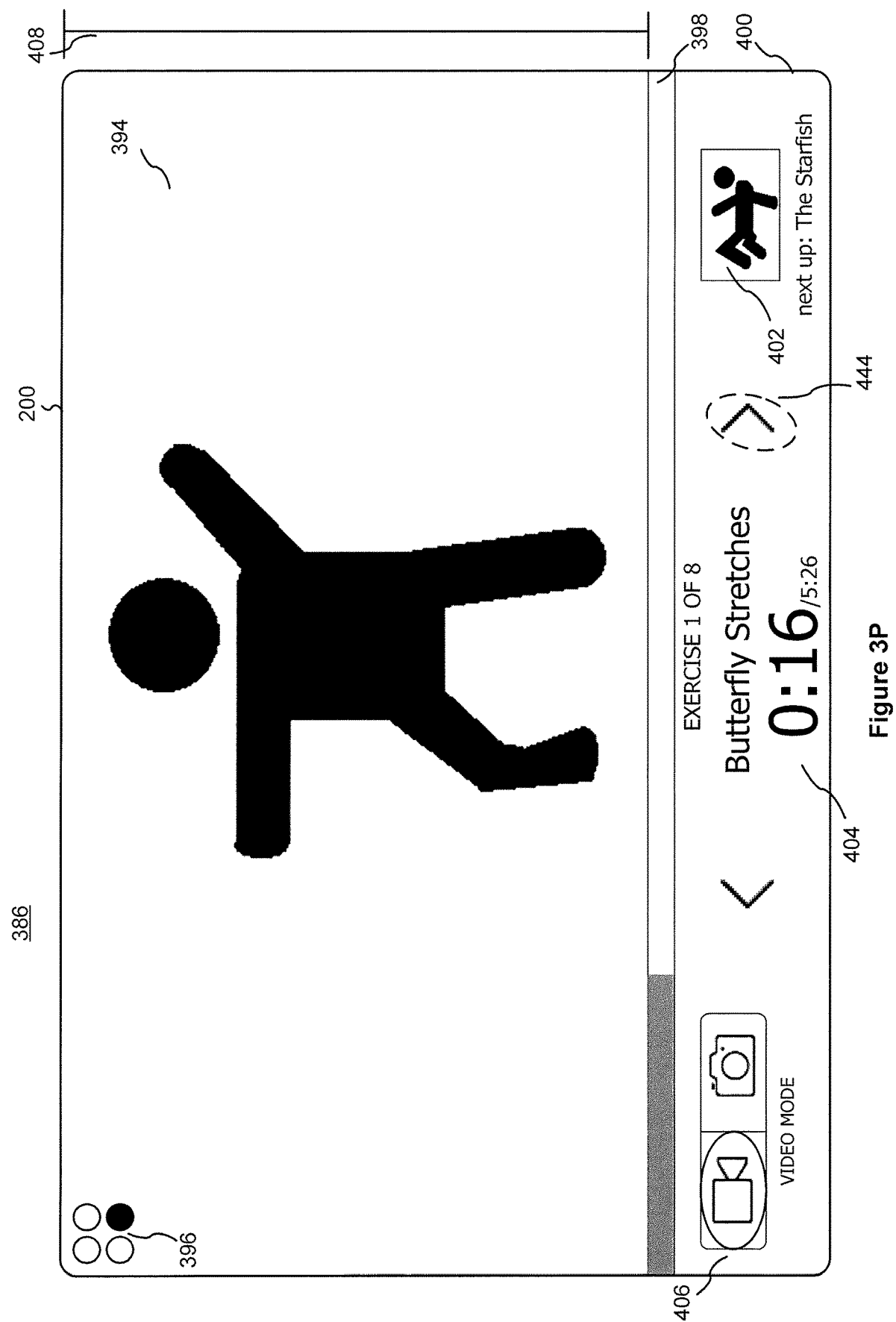
Figure 3R:
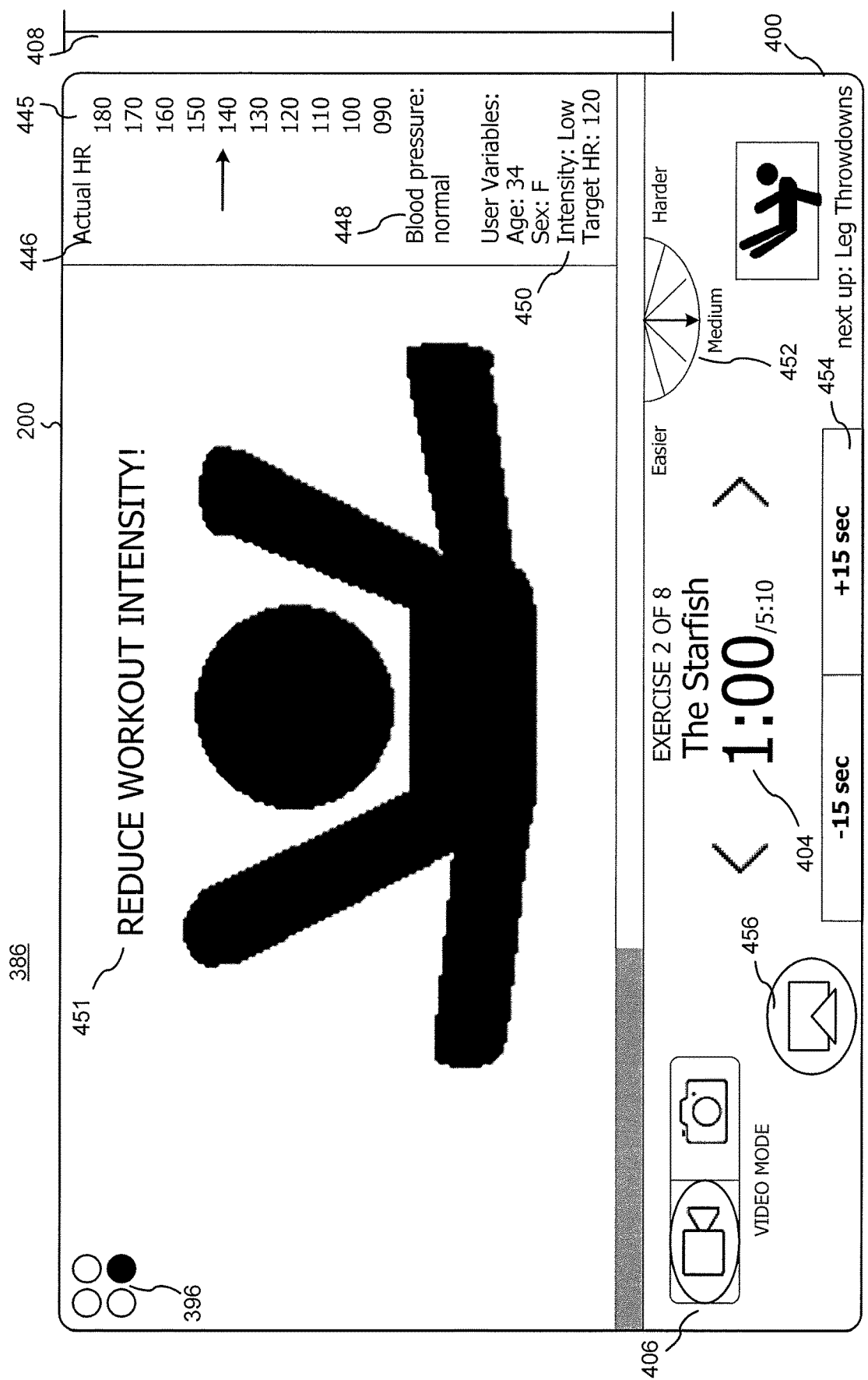
Figure 3S:
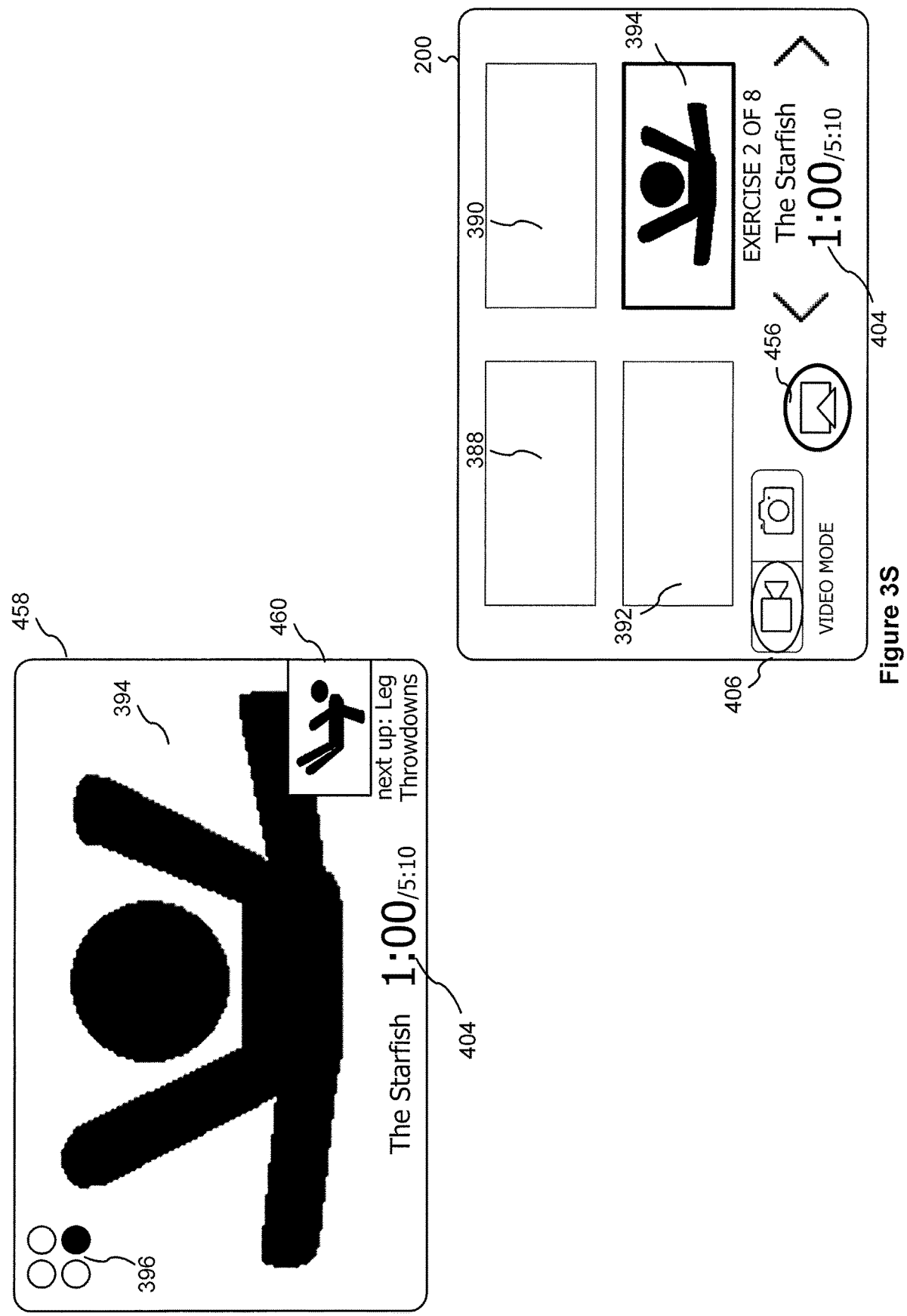
Figure 3T:
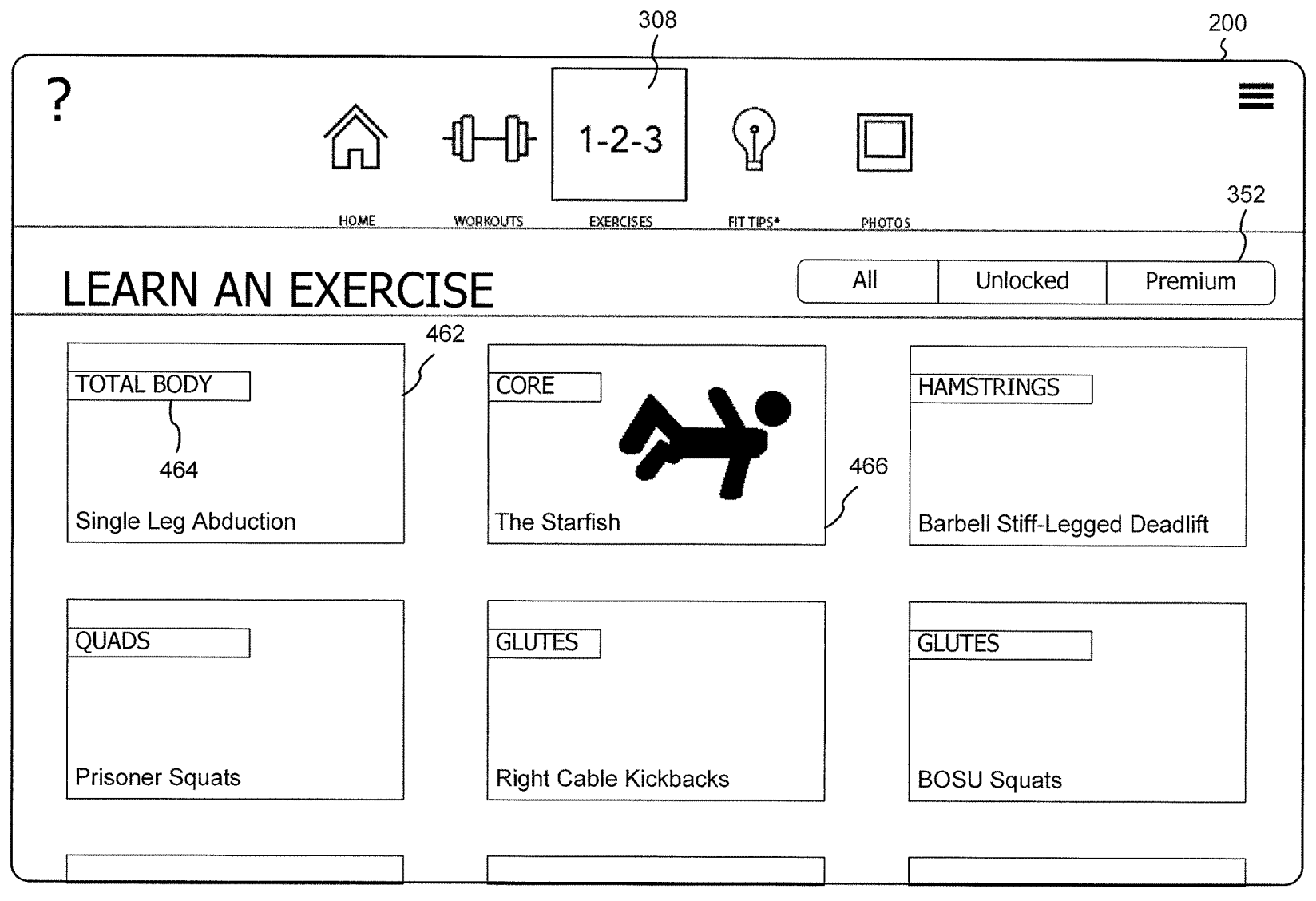
Figure 3U:
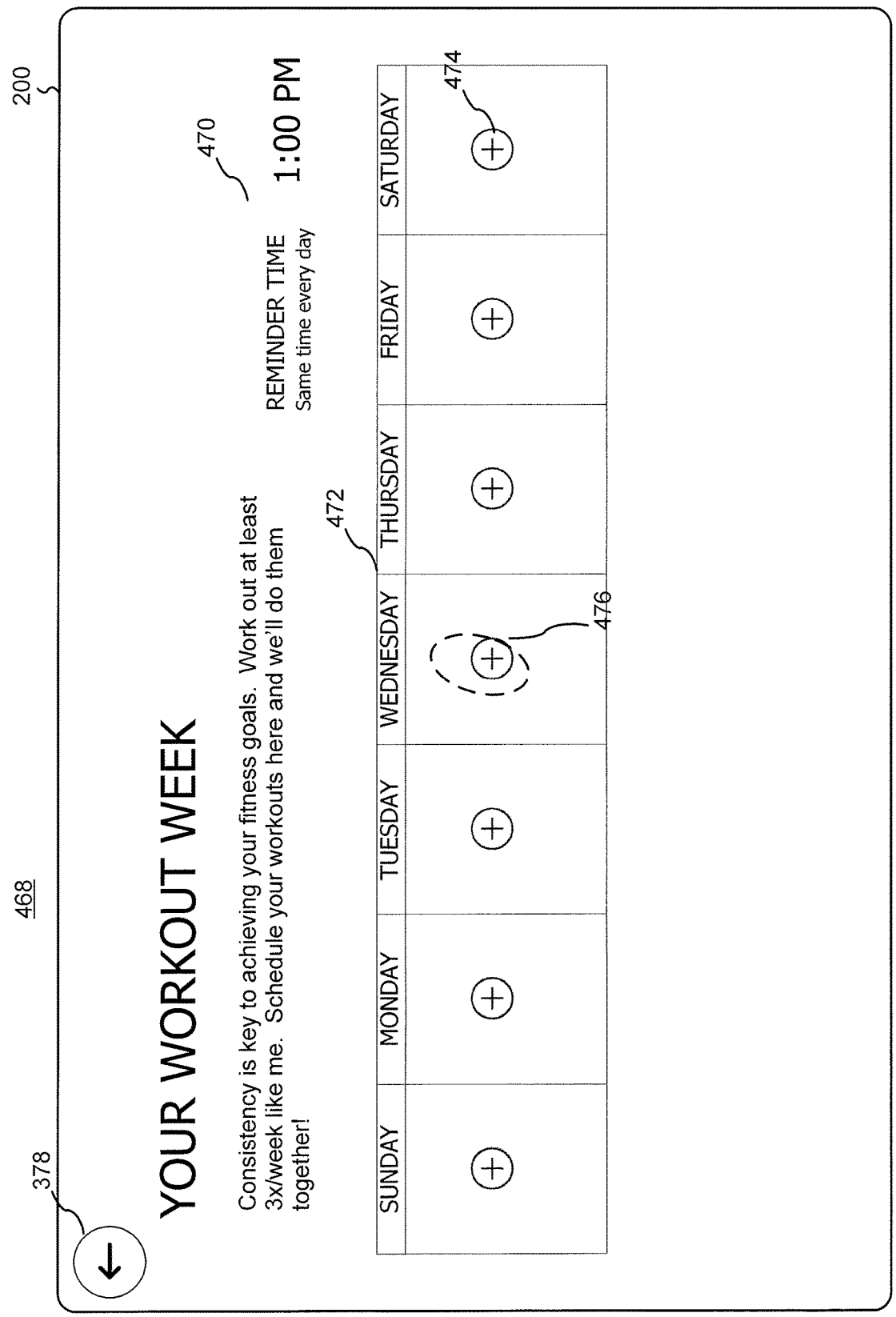
Figure 3V:
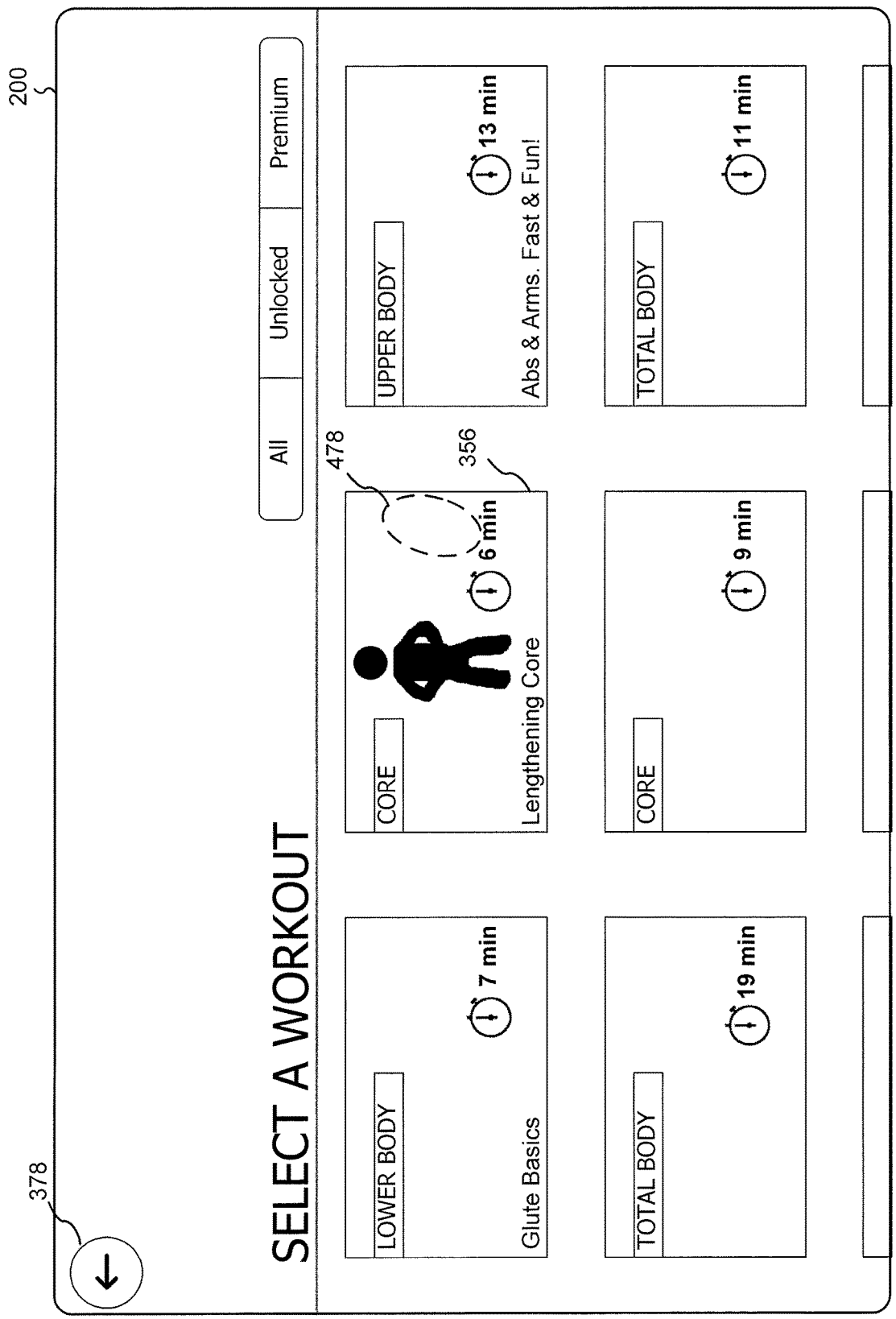
Figure 3W:
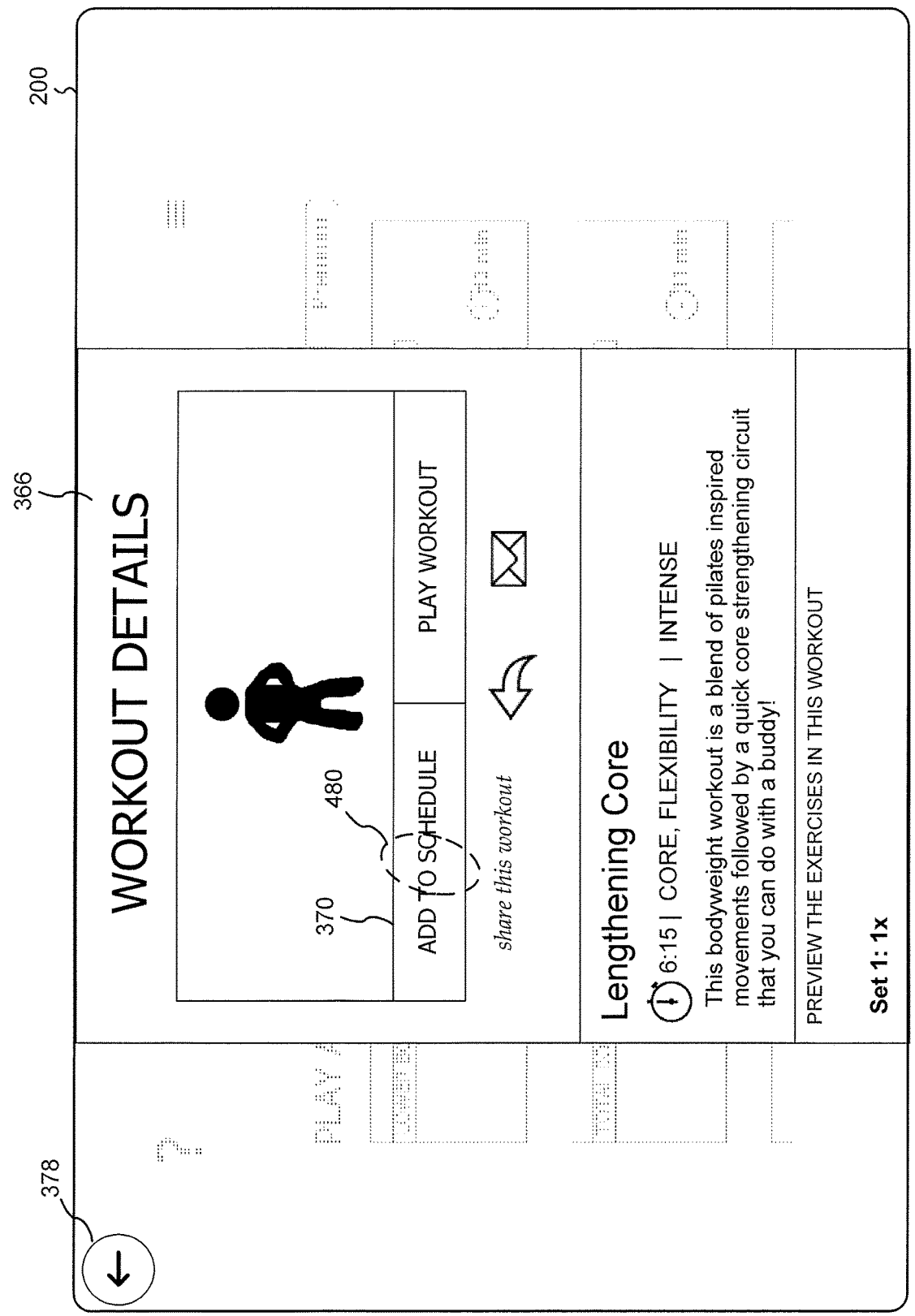
Figure 3X:
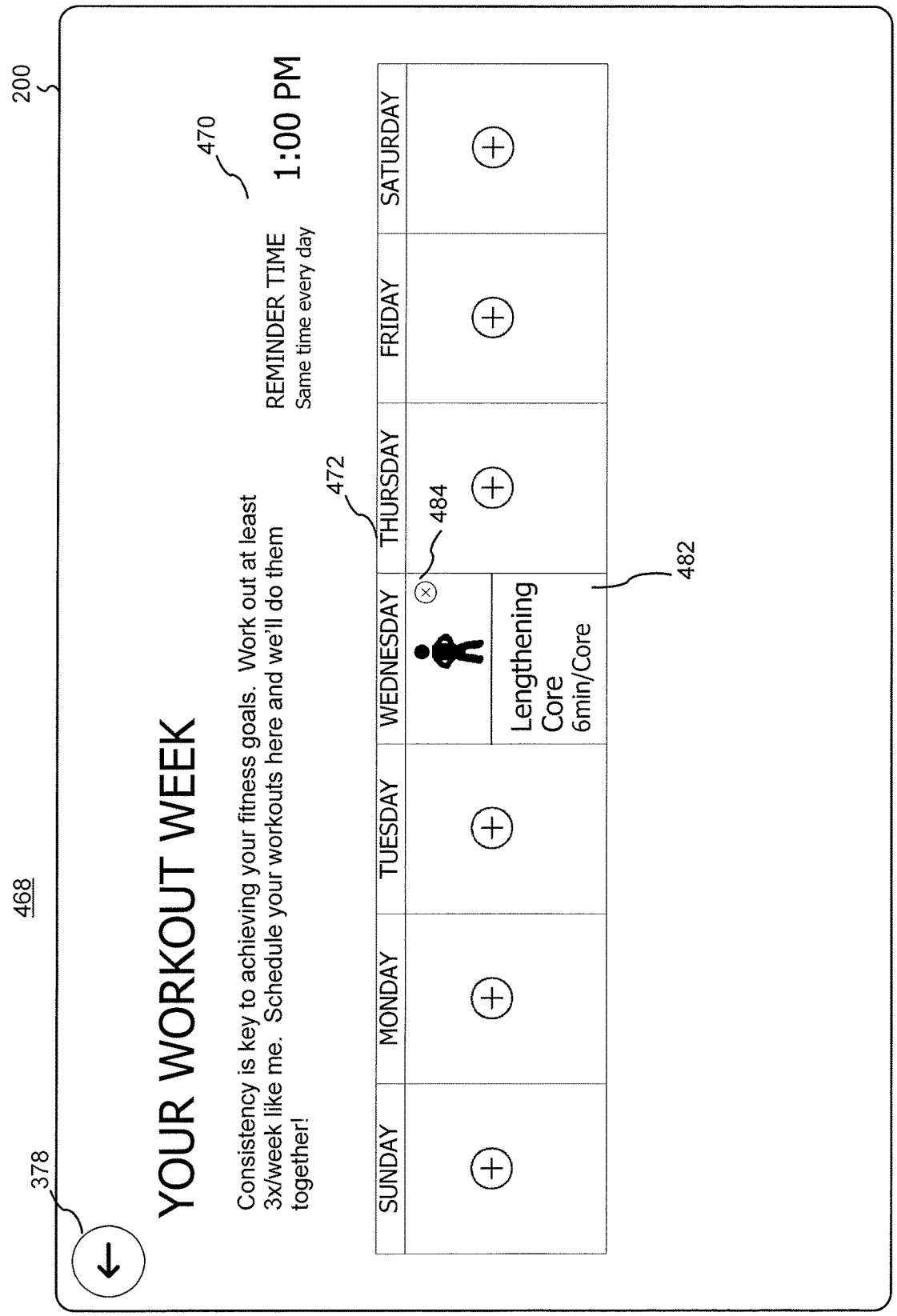

FIGS. 3A-3X illustrate exemplary user interfaces for a personal training application in accordance with some embodiments.

In some embodiments, a computer-implemented method for providing personal training services is performed at a portable electronic device (e.g., 100) with a touch screen display 112.

FIG. 3A illustrates an exemplary home screen for a personal training application, portrayed on user interface 200 (e.g. user interface 200 in FIG. 2). In FIG. 3A, several exemplary icons are shown, depicting various functions available to the user. For example, icon 302 represents "information", such as information about the application, about the company that designed the application, about the trainers involved in creating the material or the person or people portrayed in the application. Exemplary icon 304, displayed in a menu of icons, represents the home screen (or home user interface). In some embodiments, there is always an "active" icon of the exemplary menu bar of icons (e.g., comprising icons 304, 306, 308, 310 and 312). In the example shown in FIG. 3A, icon 304 is displayed in a distinct way from the other menu bar icons, to indicate that the "home" screen is currently the active one.

Other exemplary icons include icon 306, representing a screen or user interface comprising workouts for the user to browse through. In this example, a workout is a predefined sequence of one or more exercises. In some embodiments, a workout is system-generated, while in some embodiments, a workout is user-generated. In exemplary FIG. 3A, icon 308 represents a screen or user interface for the user to browse through various exercises. In some embodiments, the personal training application comprises an icon 310 representing fitness tips. In some embodiments, these fitness tips pertain to the one or more exercises contained within the personal training application. In some embodiments, the fitness tips are presented as a set of frequently asked questions posed to one or more trainers involved with the personal training application. In some embodiments, the fitness tips relate to subjects such as nutrition, motivation, safety, body image or physical and mental well-being.

In some embodiments, the personal training application comprises an icon 312, representing photos or images. In some embodiments, these are photos or still images of the one or more exercises in the personal training application. In some embodiments, these are photos or still images of the one or more subjects portrayed in the application (e.g., a celebrity trainer or model). In some embodiments, these are photos or still images of motivational logos, slogans or memes.

FIG. 3A illustrates an exemplary menu of icons (e.g., icons 304, 306, 308, 310 and 312). In some embodiments, the menu has more icons, and in some embodiments the menu has fewer icons. In some embodiments, the menu is located in a different position in the user interface (UI) 200, such as on the left or right, or bottom of UI 200. In some embodiments, the menu is ordinarily hidden, but appears when the user taps or performs another gesture on the touch screen (e.g., touch screen 112, FIG. 2).

In some embodiments, the home screen comprises icon 314, representing extra menu items. In some embodiments, the extra menu icon 314 slides the existing contents in UI 200 horizontally to the left or the right, to make room for the extra menu items. In some embodiments, the extra menu comprises some items already displayed on the user interface 200, and in some embodiments the extra menu comprises items only available through the extra menu.

In some embodiments, the home screen comprises one or more subpages of information, and a page indicator 324 to indicate which subpage of the subpages is being displayed (e.g., subpage 1 being displayed in FIG. 3A). In some embodiments, one or more of the subpages or another portion of the home screen comprises text such as text 318 to motivate the user to try a featured exercise or workout. In some embodiments, other elements on the same subpage such as text 320, play workout icon 322 or image 326 correspond to the same featured exercise or workout (e.g., a tricep exercise or upper body workout). In some embodiments, the various icons and/or text elements in FIG. 3A and other exemplary user interfaces, are affordances, such that if a particular gesture is detected on the icon or text, the user interface 200 changes accordingly. For example, if text 320 is an affordance, if the device detects a tap gesture or touch gesture on text 320, the user interface 200 displays information regarding the trainer's perspective on the featured workout.

In some embodiments, the home screen of an exemplary personal training services application comprises additional elements outside of the one or more subpages, such as icon 330, representing an affordance to see the user's "workout week." The workout week is an integrated workout scheduling tool that helps motivate the user to regularly exercise. In some embodiments, the home screen includes an affordance 328 for the user to seek out a workout to perform. In some embodiments, affordance 328 and icon/affordance 306 point to the same information (e.g., a user interface displaying one or more workouts). In some embodiments, the user interface 200 also comprises one or more elements for sharing information about the personal training application with a friend (e.g., icon 332 and icon 334). In some embodiments, the user can share information about the personal training application via a social network (e.g., Twitter or Facebook), or by another means of communication such as email, instant message, SMS or MMS.

FIG. 3A also illustrates that in some embodiments, one or more gestures detected on the user interface 200, switches display of the current subpage to another subpage of a plurality of subpages. For example, a sliding gesture from position 336-1 to 336-2 or a tap or double-tap gesture 338 detected at one edge of the user interface 200, on the subpage, switches display of the subpage from the one shown in FIG. 3A to one shown in FIG. 3B.

FIG. 3B illustrates an exemplary second subpage of a plurality of subpages on an exemplary home screen of the personal training application. In some embodiments, the page indicator 324 changes to indicate which subpage of the plurality of subpages is currently being displayed on the home screen. In some embodiments, the home screen is still indicated to be displayed through icon 304 being distinctly displayed from the other icons in a menu. In some embodiments, the second subpage of a plurality of subpages comprises information about the scheduling tool (e.g., "Workout Week"). In some embodiments, information about the scheduling tool is on another subpage of the plurality of subpages. In some embodiments, icon 340 is an affordance to allow the user to access the scheduling tool, just as icon 330 is. FIG. 3B also illustrates exemplary gestures to return to the first (or previous) subpage of the plurality of subpages. In some embodiments, one of the gestures is sliding gesture 342, where a gesture is detected on the user interface 200 from location 342-1 to 342-2. In some embodiments, gesture 344 is a tap or double tap gesture detected on the left side of the subpage or user interface 200, that changes display of the subpage to the first (or previous) subpage. In some embodiments, another gesture detected on user interface 200 changes display of the subpage to another subpage. In some embodiments, one of the subpages (or a page) comprises a "quick start workout" selection tool that picks a random or recommended workout for the user to perform. In some embodiments, the user can select a target skill or body region to work on (e.g., core), but have the system select a random or recommended workout focusing on that selected skill or body region (e.g., Lengthening Core workout).

FIG. 3C illustrates display of the first subpage again, in response to the one or more gestures in FIG. 3B. In some embodiments, detecting a gesture (e.g., gesture 346 or gesture 348) on user interface 200 at either icon 306 or icon 328, changes display of user interface 200 to one comprising one or more workouts for the user to browse through.

FIG. 3D illustrates the workout page of the personal training application. In some embodiments, the workouts icon 306 in the menu bar is displayed in a distinct way (e.g., enlarged, colored differently, or outlined), to indicate that the workouts page is the currently displayed page on user interface 200. In some embodiments, the workouts page illustrates one or more available workouts for the user to choose from, in a listed view (e.g., the workouts are displayed as a list). In some embodiments, as shown in FIG. 3D, the one or more workouts are displayed as thumbnails (e.g., thumbnails 354 or 356), or small still images of one or more poses in the respective workout. In some embodiments, the workout page displays a different number of thumbnails in a respective row of thumbnails (e.g., 2 images per row, or 4 images per row). In some embodiments, the workout page comprises an adjustment mechanism to display more or fewer thumbnails in each row.

In some embodiments, a respective thumbnail (e.g., thumbnail 354) of the one or more thumbnails comprises a title for the workout (e.g., Glute Basics), a category 360 (e.g., Lower Body) and a time duration 358 for the workout (e.g., 7 min). In some embodiments, a respective thumbnail (e.g., thumbnail 356) of the one or more thumbnails comprises an image 362 to illustrate the respective workout.

In some embodiments, the workout page comprises a title 350, and other instructive text. In some embodiments, the workout page comprises a sorting menu 352 comprising more than one viewing option (e.g., All, Unlocked, Premium), each represented by a respective affordance. The exemplary sorting menu 352 can be depicted in various ways, including a drop-down menu. In some embodiments, the personal training application comprises "locked" or "Premium" workouts that do not come unlocked upon initial installation of the application on the user's device. In some embodiments, these locked/Premium workouts can be unlocked through a payment of money, entering a code, completing a certain duration or number of workouts, completing a social/community action, or submitting an entry into a contest or promotion.

FIG. 3D also depicts an exemplary gesture 364 detected on thumbnail 356, to select the respective workout. In some embodiments, the workout page comprises more workouts (displayed in a respective way), than can be displayed on a single page. In such embodiments, the workout page allows for scrolling down through the plurality of workouts, by a scrolling means such as a sliding gesture on the user interface 200, a tap or double tap gesture on a particular region of UI 200, or a scroll bar.

FIG. 3E illustrates an exemplary view of an intermediate workout detail page 366, displayed, in some embodiments, in response to detecting selection of a respective workout from the workout page. In some embodiments, the intermediate workout detail page comprises an image 368 representative of the workout. In some embodiments, image 368 is the same image shown in the respective thumbnail for the workout in the workout page (e.g., image 362, FIG. 3D). In some embodiments, intermediate workout detail page 366 comprises various affordances, such as affordance 370 to add the selected workout to the scheduling tool, affordance 372 to play the workout, or affordances 332 and 334 for sharing the workout by one of several communication means (e.g., social media, instant messaging, SMS, MMS or email).

In some embodiments, displaying the intermediate workout detail page 366, includes shrinking and distorting display of the workout page 357 (e.g., as shown in FIG. 3D), behind the intermediate workout detail page 366. In some embodiments, the intermediate workout detail page 366 comprises text to describe the workout, including descriptors such as the duration, level of intensity, and fitness skills to be developed. In some embodiments, the intermediate workout detail page 366 also comprises additional information that cannot be displayed on the screen, therefore, the device detects one or more gestures, such as sliding gesture 374 or tap or double tap gesture 376 to display the additional information. In some embodiments, displaying the intermediate workout detail page 366, includes displaying a "Back" affordance 378 to revert back to the previously displayed page (e.g., shown in FIG. 3D). In some embodiments, a respective workout is a compilation of one or more exercises, presented in a user-generated or system-generated order. In some embodiments, to save the device and/or application from excessive use of memory, respective workouts comprise links to one or more exercises, therefore allowing for many permutations of workouts without having to store these permutations as full-length files. For example, a workout comprising exercises A, B and D stores links to the locally or remotely stored copies of these three exercises, without storing a copy of a full-length workout video, image or audio track comprising exercise A, B and D merged into one file.

FIG. 3F illustrates an exemplary representation of additional information that could not be displayed in a single page display of the intermediate workout detail page 366. In some embodiments, the additional information comprises a listing of the various exercises in the selected workout. In some embodiments, the listing of the exercises comprises one or more thumbnails or small images 380, representative of the respective exercise. In some embodiments, one or more exercises listed in the additional information in workout detail page 366, has an associated "Practice" affordance 381. In some embodiments, if the user wishes to practice, or get familiar with a respective exercise, the user can select the corresponding practice affordance 381, to play a practice-version of the respective exercise. In some embodiments, a practice-version of an exercise does not have a timer, and in some embodiments, a practice-version of an exercise does not have tones or indications to keep pace or to count down to the end of the predefined exercise duration. In some embodiments, a practice-version of an exercise comprises visual information, but no audio information. In some embodiments, a practice-version of an exercise is portrayed exactly how it is portrayed in the respective workout.

FIG. 3F also illustrates an exemplary gesture (e.g., sliding gesture 382 from location 382-1 to 382-2) to view the information at the top of workout detail page 366. FIG. 3G illustrates the top of the intermediate workout detail page 366, and selection 384 of the "Play Workout" affordance.

FIG. 3H illustrates an exemplary workout-mode 386. In some embodiments, while in workout-mode 386, the user interface 200 comprises at least two distinct regions, first region 408, and second region 400. In some embodiments, the first region 408 is configured to display videos or still images, illustrating the respective workout. In some embodiments, the second region 400 comprises elements such as a projection-mode indicator 406 that indicates if the user is viewing the workout in a video more or an image mode. In some embodiments, second region 400 comprises one or more timers 404. In some embodiments, one or more of timers 404 indicate the time remaining for a respective exercise or workout. In some embodiments, one or more of timers 404 indicate the time elapsed for a respective exercise or workout. In some embodiments, the second region 400 comprises an indication of the next exercise in the current workout (e.g., "The Starfish" exercise). In some embodiments, the depiction of the next exercise comprises a representation 402, which is a still image or a short, repeating or non-repeating video clip. In some embodiments, representation 402 is a still image for the majority of the duration of the current exercise of the current workout (e.g., "Butterfly Stretches" exercise), but turns into a short video segment near the end of the currently playing exercise (e.g., turns into a video 5 seconds before the end of "Butterfly Stretches"). In some embodiments, the second region 400 also indicates which exercise is currently being played, and how many exercises are in the current workout (e.g., exercise 1 of 8).

In some embodiments, the second region 400 also comprises one or more affordances 403 to permit the user to skip or repeat exercises within the workout. In some embodiments, the user can fast forward, rewind, skip forward, fast forward or rewind at double speed, pause, stop or start from the beginning of the workout using affordances (e.g., affordance 403), or gestures detected on UI 200 (e.g., a single tap to indicate "pause"). FIG. 3H also illustrates a progress bar 398 that in some embodiments, adapts to visually indicate how much of the respective workout has been completed. In some embodiments, progress bar 398 is configured to visually indicate the progress of the current exercise of the current workout. In some embodiments, there is one progress bar 398 to indicate the progress of the current workout and another progress bar 398 to indicate the progress of the current exercise. In some embodiments, the one or more progress bars 398 are contained in the second region 400.

In some embodiments, first region 408 is configured to display one or more video panels (e.g., panels 388, 390, 392 and 394), depicting the current exercise of the current workout. In some embodiments, the first region 408 is configured to display two modes while the projection-mode indicator 406 is set to video mode, namely a "zoomed-out" mode and a "zoomed-in" mode. FIG. 3H illustrates an exemplary "zoomed-out" mode, displaying more than one video panel (e.g., 4 video panels), where each video panel is focused on the same moving object (e.g., a representation of a personal trainer demonstrating the exercise). In some embodiments, one video panel (e.g., panel 388) of the plurality of video panels displayed in the "zoomed-out" mode, is a mixed-view panel that switches between displaying views shown in the other panels (e.g., panels 390, 392 and 394), and in some embodiments, between views shown in the other panels along with unique views such as close-ups on portions of the moving object. In some embodiments, the one or more remaining panels (e.g., in this case, panels 390, 392 and 394), display fixed perspectives of the moving object. For example, video panel 390 shows the personal trainer from a camera positioned at her left side, video panel 392 shows the personal trainer from a camera positioned at her right side, and video panel 394 shows the personal trainer from a camera positioned somewhat behind, above or below her.

In some embodiments, in the exemplary "zoomed-out" mode, the plurality of video panels are displaying their respective videos in synchronicity with each other, and with the one or more timers 404. In some embodiments, while the workout is being played (i.e., not stopped, paused or completed), audible information pertaining to the workout is also played. In some embodiments that audible information is played in synchronicity with the one or more timers 404. In some embodiments, the audible information is narration provided by a human or machine-generated speaker, not visible in the content presented in the first region 408. In some embodiments, the audible information comprises tones or cues to indicate the pace of performing the one or more exercises in the workout, or to alert the user when a respective exercise is nearing its end. In some embodiments, the audible information is provided in synchronicity with the video presentation in the one or more video panels. In some embodiments, where the moving object in the one or more video panels is a personal trainer, the audible information is speech generated by the personal trainer and is presented in synchronicity with the video presentation of the personal trainer. The various described traits of the audible information still apply to other exemplary visual presentations in first region 408 (e.g., while in "zoomed-in" video mode, or image mode).

FIG. 3H also illustrates the exemplary use in user interface 200 while workout mode 386 is in video mode, of active panel indicator 396. In some embodiments, active panel indicator 396 indicates how many video panels are on display (e.g., 4 circles representing 4 panels). In some embodiments, one or more gestures 410 detected on user interface 200, transition display of the workout mode 386 from a "zoomed-out" video mode shown in FIG. 3H to a "zoomed-in" video mode. In some embodiments, such a gesture 410 is a double-tap gesture, or a tap gesture, or a pinching gesture performed with at least two fingers. In some embodiments, the one or more gestures 410 are detected on one of the plurality of video panels (e.g., on panel 388), in order to indicate a desire to zoom into that particular panel.

FIG. 3I illustrates an exemplary "zoomed-in" video mode of the workout mode 386 of the personal training application. In some embodiments, the "zoomed-in" video mode consists of displaying in first region 408, a single video panel of the plurality of video panels that were displayed in the "zoomed-out" mode. For example, FIG. 3I shows video panel 388, of the 4 video panels in FIG. 3H. In some embodiments, while the "zoomed-in" video mode is displayed, the active panel indicator 396 is updated to indicate which video panel of the plurality of video panels, is being currently displayed. For example, video panel 388 is in the top-left quadrant of the 4 video panels in FIG. 3H, therefore the top-left circle in active panel indicator 396 is highlighted to remind the user of the panel being currently displayed. In some embodiments, the "zoomed-in" video mode consists of displaying more than a single video panel of the plurality of video panels in the "zoomed-out" mode, but a subset of the plurality of panel (e.g., displaying 2 out of 4 panels). In some embodiments, the user can navigate among the various video panels, while in the "zoomed-in" video mode. Exemplary gesture 412 illustrates one way to switch display of the current video panel with another video panel (i.e., making a sliding motion from position 412-1 to 412-2 to switch to the top-right panel). Other gestures can be detected to switch to another panel in the plurality of panels (e.g., a double-tap gesture on the right side of user interface 200).

FIG. 3J illustrates display of another exemplary video panel 390 of the plurality of video panels. FIG. 3J also illustrates exemplary gestures that can be detected on user interface 200 to transition display of video panel 390 to display of another video panel. For example, a sliding gesture 418, from position 418-1 to 418-2 transitions display from the top-right panel to the bottom-right panel (in a 4-panel embodiment), and exemplary sliding gesture 416, from position 416-1 to 416-2 transitions display from the top-right panel to the bottom-left panel (in a 4-panel embodiment). FIG. 3J also illustrates that active panel indicator 396 changed in appearance from FIG. 3I, to indicate that the top-right panel of the plurality of video panels is the one being currently displayed. In some embodiments, exemplary gesture 414 in FIG. 3J reverts the display in first region 408 to the "zoomed-out" video mode. In some embodiments, the gesture to transition from the "zoomed-in" mode to the "zoomed-out" mode is the same gesture as the one used to transition from the "zoomed-out" mode to the "zoomed-in" mode (e.g., a double-tap gesture). In some embodiments it is a different gesture. It should be noted that in some embodiments, the transitions between display of respective video panels in the "zoomed-in" mode, as well as the transitions between display of the "zoomed-in" mode and "zoomed-out" mode are seamless, virtually instantaneous and intuitive to the user. For example, in the 4-panel embodiment with a depiction of a personal trainer who is also the speaker, the user does not observe any gap in speech or visual portrayal of the respective exercise, while transitioning among the various video display options.

FIG. 3K illustrates the exemplary "zoomed-out" mode again, along with exemplary gesture 420, used to pause the workout. In some embodiments, detecting the exemplary "pause" gesture 420 immediately pauses the workout and corresponding audio and video playback (or image slideshow and audio playback in some embodiments of the image mode). In some embodiments, an intermediate user interface or user interface element is displayed, prompting the user to confirm a desire to pause the workout (e.g., in case the user accidentally touched the screen).

FIG. 3L illustrates an exemplary screen shot of the personal training application when it is in a paused mode. In some embodiments, the user interface 200 comprises an option bar 422 with the title of the current workout (e.g., Lengthening Core), an affordance to cancel or exit the workout (e.g., Cancel), an affordance 426 to change or select an audio playlist or possibly an affordance 428 to view the workout details of the current workout (e.g., similar to workout details page 366 in FIG. 3E).

In some embodiments, while in a paused mode of workout mode 386, the user interface 200 comprises an affordance 424 to resume the workout. In some embodiments, instructions 430 to perform one or more operations in workout mode 386 are displayed, to instruct the user on ways to operate the personal training application. In some embodiments, display of the option bar 422 while the application is paused, includes moving the active-panel indicator 396 down, correspondingly. FIG. 3L also illustrates an exemplary gesture 432 detected on the image-mode affordance of the projection-mode indicator 406.

FIG. 3M illustrates a transition from display of the video mode of workout mode 386, to an exemplary image mode of workout mode 386. FIG. 3M also illustrates that in some embodiments, one or more elements in the first region 408 or second region 400 are still active while the workout is paused. In some embodiments, the image mode comprises one or more still images 434 of the current exercise of the current workout (e.g., Butterfly Stretches of the Lengthening Core workout). In some embodiments, an image indicator 436 indicates which image of a plurality of images is currently being displayed. In some embodiments, when there is a plurality of images in the image mode, the image mode is set to display the images in a slideshow format. FIG. 3M also illustrates exemplary gesture 438 to resume the workout from the paused mode.

FIG. 3N illustrates progression of an exemplary image mode of workout mode 386, illustrating that image indicator 436 changes to highlight the respective circle (i.e., indicator) corresponding to the currently displayed image 434. In some embodiments, the user can progress through display of the plurality of images by performing one or more gestures on user interface 200 (e.g., a sliding gesture, a double-tap gesture). In some embodiments, the one or more images 434 displayed in the image mode can be zoomed into and zoomed out of, by detecting one or more gestures on user interface 200 or an affordance. FIG. 3N also illustrates exemplary gesture 440 detected on the video icon of projection-mode indicator 406.

FIG. 3O illustrates the exemplary "zoomed-out" video mode of workout mode 386. In some embodiments, transitioning from an image mode to the video mode of workout mode 386, involves displaying the "zoomed-out" video mode under all circumstances. In some embodiments, transitioning from an image mode to the video mode of workout mode 386, involves displaying whatever state the video mode was in before transitioning to the image mode (e.g., if the video mode was in a "zoomed-in" mode displaying the top-right quadrant of a 4 panel embodiment). FIG. 3O also illustrates that in some embodiments, one panel (e.g., panel 388) of a plurality of panels in a "zoomed-out" video mode, displays a mixture of camera shots and camera angles of the moving object, while the remaining video panels depict fixed camera angles and views. FIG. 3O illustrates exemplary gesture 442 to zoom in on panel 394, as shown in FIG. 3P.

FIG. 3P illustrates an exemplary gesture 444 on an exemplary affordance in second region 400, to forward to the next exercise of the current workout. FIG. 3P illustrates panel 394 of the plurality of video panels. In some embodiments, a subsequent exercise in the current workout, continues to be displayed in the same format in workout mode 386, as was displayed before the subsequent exercise is played. For example, video panel 394 shows a rear-view of a personal trainer. In FIG. 3P, the rear-view of the personal trainer was shown performing "Butterfly Stretches", and in FIG. 3Q, the rear-view of the personal trainer is shown performing "The Starfish." FIG. 3Q illustrates that representation 402 is updated with a new upcoming exercise.

FIG. 3R illustrates some additional features that are included in some embodiments of the workout mode 386 of the personal training application. In some embodiments, the workout mode 386 comprises a third region 445. In some embodiments, the third region 445, comprises biometric feedback data (e.g., heart rate 446) from one or more externally-connected devices, such as a pedometer, a heart rate monitor, a blood pressure monitor, an accelerometer or a user-wearable device such as a bracelet, watch, pendant, headgear, gloves, eyewear or a device that attaches to or resides within the user's footwear or clothing. In some embodiments, the biometric feedback data (e.g., heart rate 446) is transmitted via a wired or wireless connection, such as via external port 124, FIG. 2, or via RF circuitry 108, FIG. 1.

In some embodiments, the biometric feedback data is transmitted as a quantitative value (e.g., actual heart rate 446), and in some embodiments, the biometric feedback data is transmitted as a qualitative value (e.g., blood pressure 448). In some embodiments, the user enters user information 450 such as age, gender, weight, preferred exercise intensity, and/or target heart rate before starting the workout. In some embodiments the user information 450 is stored in the memory of the application or device (e.g., memory 102). In some embodiments, the user information 450 is associated with a user name or user account registered with the application. In some embodiments, user accounts are hosted on a remotely located server. In some embodiments, the application displays instructional feedback 451 based on the user's information and the biometric feedback information.

In some embodiments, the workout mode 386 comprises a workout intensity adjustor 452, to increase or decrease the intensity of the current workout (e.g., by rotating a dial, scrolling through options, checking off boxes or another means of adjustment). In some embodiments, intensity of a respective exercise can be adjusted by one or more modifications to the respective exercises. For example, a basic pushup can be made less intense by instructing the user to place her knees on the ground, or a basic pushup can be made more intense by instructing the user to lift one leg while performing a pushup. In some embodiments, modifications to the existing exercises in the current workout are visually presented to the user, to allow the user to select one or more modifications, if they so desire. In some embodiments, the modifications to the respective workout are saved with the user's account information, for future retrieval. In some embodiments, modifications to one or more exercises in a respective workout are presented to the user before commencing the workout, and in some embodiments, modifications to the respective workout are presented to the user while he is performing the workout.

In some embodiments, the workout mode 386 comprises affordances 454 to increase or decrease the length of time of the current exercise (e.g., The Starfish) of the current workout. In some embodiments, the application remembers the user's preferences and adjusts future workouts accordingly (e.g., switching out exercises that the user does not like, for a complementary one). In some embodiments, the affordances 454 allow for an increase or decrease of time in predefined increments of time (e.g., 1 second, 5 seconds, 15 seconds etc.). In some embodiments, the application automatically adjusts the duration of the current exercise, or adjusts the workout intensity adjustor 452, based on the biometric feedback data. In some embodiments, the workout mode 386 comprises an affordance 456 to project one or more elements on user interface 200 onto another screen (e.g., a television screen, computer monitor, tablet, projector or monitor on an exercise machine).

FIG. 3S illustrates an exemplary transmission mode, where one or more elements of user interface 200 are projected onto another screen 458. In some embodiments, the elements projected onto screen 458 include a representation 460 of the next exercise in the workout, where representation 460 is a still image or a video. In some embodiments, the representation 460 of the next exercise in the workout is displayed on screen 458 only when a predefined amount of time is remaining in the current exercise (e.g., 5 seconds remaining in current exercise). In some embodiments, screen 458 also projects the active panel indicator 396, and one or more timers 404 along with other identifying information regarding the current exercise and/or workout being played. In some embodiments, screen 458 displays a progress bar displaying progress of the current exercise or current workout.

In some embodiments, while operating in a transmission mode, user interface 200 changes from its display in workout mode 386, to display simplified controls to operate the projection on screen 458. For example, user interface 200 shows representations of the plurality of video panels in video mode, and an indication (e.g., highlighting or outlining) of an active panel of the plurality of panels. In this example, panel 394 is shown as the active video panel highlighted in user interface 200 and displayed on screen 458. In some embodiments, more than one video panel, up to and including all the video panels, are active panels and displayed on screen 458. In some embodiments, user interface 200 comprises projection-mode indicator 406 to allow the user to quickly switch between projecting video mode and image mode. In some embodiments, user interface 200 comprises more or fewer elements, depending on the screen size of the portable electronic device comprising UI 200 (e.g., a smart phone, tablet or wearable device). For example, a tablet comprising UI 200, may display biometric feedback data, a music selection icon, additional tips or additional text than a smart phone comprising UI 200.

In some embodiments, a different subset of gestures is recognized by user interface 200, while in transmission mode. For example, in some embodiments, a tap gesture on a single panel of the plurality of panels, makes that panel an active video panel. In some embodiments, a swipe gesture detected on user interface 200 to the right, the left, upwards or downwards transitions through display of the various video panels. In some embodiments, screen 458 is a directly mirrored version of workout mode 386, displayed on user interface 200. In some embodiments, transmission mode renders user interface 200 dark, but still responsive to one or more gestures on the screen.

In some embodiments, while in transmission mode, the elements on screen 458 are configured to be controlled by an external remote control device. In some embodiments, the external remote control device is a user-wearable device, such as a bracelet, watch, pendant, headgear, gloves, eyewear or a device that attaches to or resides within the user's footwear or clothing. In some embodiments, the external remote control device FIG. 3T illustrates an exemplary page for icon 308 for the user to browse through various exercises. The exemplary exercise page shown, displays several exercises that are component exercises of the workouts described earlier. In some embodiments, the one or more exercises are displayed as a list and in some embodiments, the one or more exercises are displayed as thumbnails 462, 466. In some embodiments, the thumbnails (e.g., thumbnail 466) comprises one or more images exhibiting the respective exercise, and in some embodiments the thumbnails (e.g., thumbnail 462) comprise a title and/or a descriptor 464 of the exercise. In some embodiments, the exercise page also comprises a menu 352 to sort viewing of the exercises.

FIG. 3U illustrates an exemplary scheduling tool 468. In some embodiments, the scheduling tool 468 comprises a "Back" affordance 378 to revert back to the previously displayed page. In some embodiments, the scheduling tool 468 comprises a weekly calendar 472 with entries for each day of the week. In some embodiments, the scheduling tool 468 comprises a daily reminder time 470, to remind the user to perform his scheduled workout for the respective day. In some embodiments, a different time can be set for each respective day or for each respective workout of the week. In some embodiments, each daily entry in calendar 472 allows for the scheduling of one or more workouts. In some embodiments, each daily entry in calendar 472 comprises an "Add workout" affordance 474 to add one or more workouts to the respective day. In some embodiments, user input 476 is a gesture detected to add one or more workouts to a respective daily calendar entry.

FIG. 3V illustrates an exemplary workout selection page, very similar to the "Play a workout" page displayed in FIG. 3D. In exemplary workout selection page FIG. 3V, in some embodiments, one or more workouts are selected by detection of one or more gestures (e.g., gesture 478) on the UI 200. In some embodiments, detecting a gesture (e.g., gesture 478) on a workout representation (e.g, thumbnail 356), prompts display of a workout details page 366, as shown in FIG. 3W. The exemplary workout details page 366, in FIG. 3W, comprises an affordance 370 to add the selected workout to the scheduling tool. In some embodiments, the respective workout is added to the scheduling tool by detecting a user input 480 on affordance 370.

FIG. 3X illustrates exemplary scheduling tool 468, displaying the addition of a workout 482 to the "Wednesday" entry of calendar 472. In some embodiments, a workout that has been added to the calendar comprises an affordance 484 to delete the workout from the respective entry of calendar 472. In some embodiments, the scheduling tool 468 comprises other means of editing the weekly workout calendar than adding or deleting respective workouts. For example, in some embodiments, the scheduling tool allows for swapping one workout from a first day of the week to a second day of the week (e.g., by dragging a workout from Friday to Tuesday). In some embodiments, the scheduling tool 468 generates alerts, tones, vibrations or other notifications to remind the user to perform her scheduled workout. In some embodiments, these notifications are visible to the user outside of the personal training services application. In some embodiments, the personal training services application learns how to intelligently schedule workouts for the user, from observing the user's behavior. For example, if the user performs the Lengthening Core workout for three consecutive Wednesday evenings, the application learns to add this particular workout at this particular time, to the scheduling tool 468.

Figure 4A:
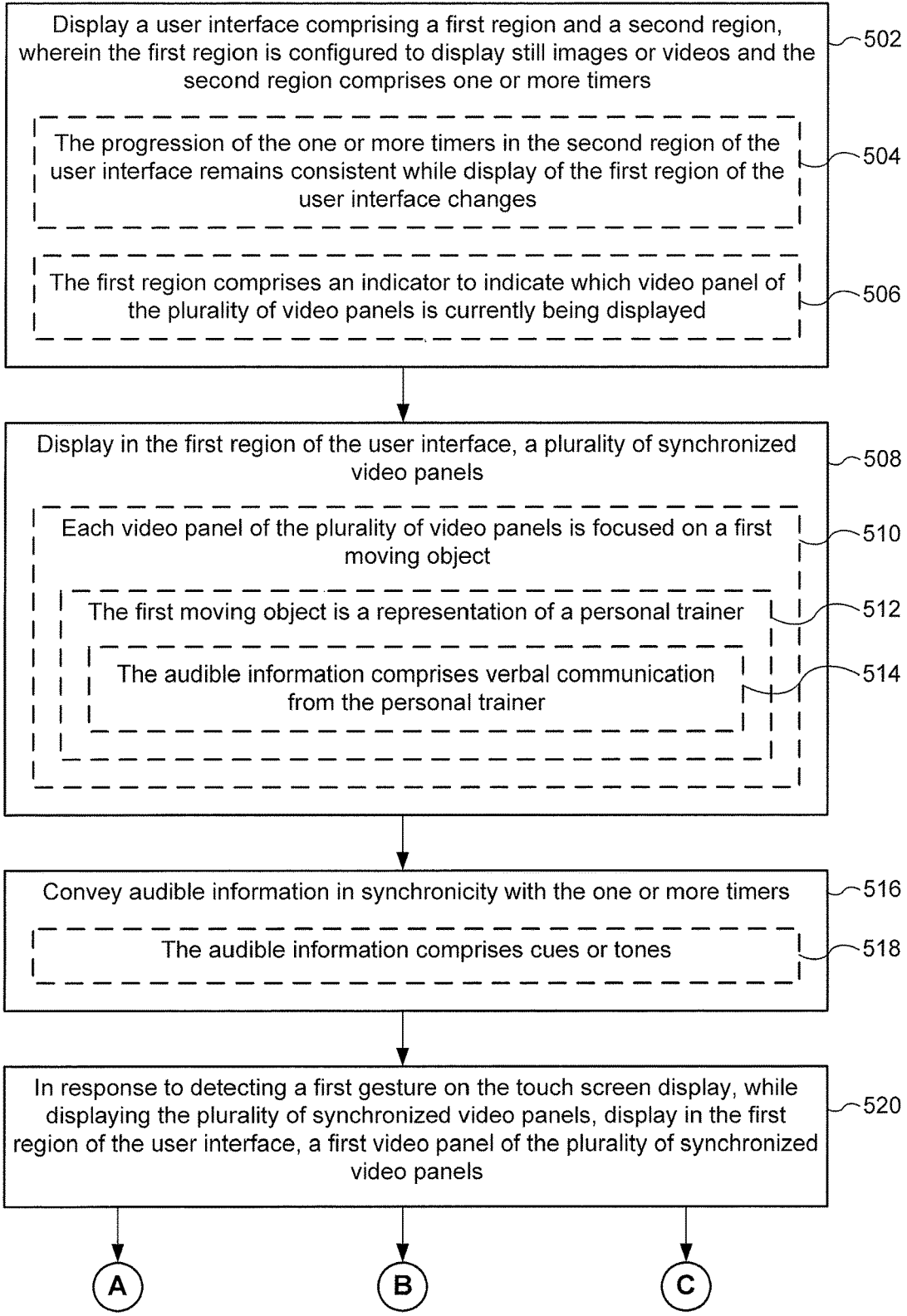
FIGS. 4A-4B are a flow diagram for an exemplary method for providing personal training services at a portable electronic device.
Figure 4B:
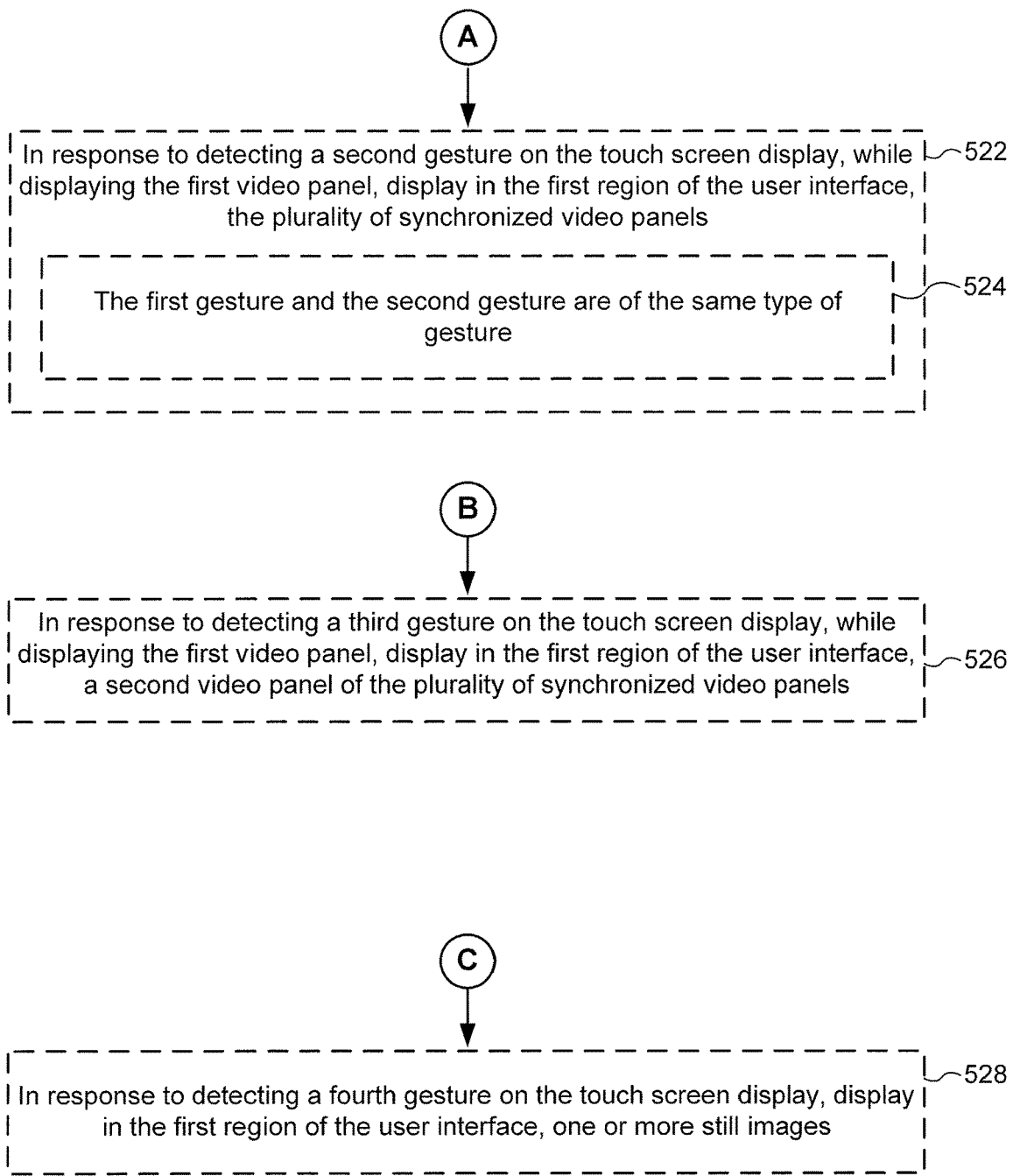

FIG. 4A to 4B are a flow chart for an exemplary method 500 of providing personal training services, at a portable electronic device having a touch screen display. The method includes displaying (502) a user interface (e.g., UI 200, FIG. 3H) comprising a first region (e.g., first region 408, FIG. 3H) and a second region (e.g., second region 400, FIG. 3H), wherein the first region is configured to display still images or videos and the second region comprises one or more timers. In some embodiments, the progression (504) of the one or more timers in the second region of the user interface remains consistent while display of the first region of the user interface changes. In some embodiments, the first region comprises (506) an indicator to indicate which video panel of the plurality of video panels is currently being displayed.

The method further includes displaying (508) in the first region of the user interface, a plurality of synchronized video panels (e.g., video panels 388, 390, 392 and 394, FIG. 3K). In some embodiments, each video panel (510) of the plurality of video panels is focused on a first moving object. In some embodiments, the first moving object is (512) a representation of a personal trainer. In some embodiments, the audible information comprises (514) verbal communication from the personal trainer.

The method further includes conveying (516) audible information in synchronicity with the one or more timers. In some embodiments, the audible information comprises (518) cues or tones (e.g., a countdown timer or tones to keep a pace). The method further includes, in response to detecting a first gesture on the touch screen display, while displaying the plurality of synchronized video panels, displaying (520) in the first region of the user interface, a first video panel of the plurality of synchronized video panels. For example, as shown in FIG. 3H and FIG. 3I, gesture 410 is detected on video panel 388.

In some embodiments, the method further includes, in response to detecting a second gesture on the touch screen display, while displaying the first video panel, displaying (522) in the first region of the user interface, the plurality of synchronized video panels. In some embodiments, the first gesture and the second gesture (524) are of the same type of gesture (e.g., both are a double-tap gesture).

In some embodiments, in response to detecting a third gesture on the touch screen display, while displaying the first video panel, displaying (526) in the first region of the user interface, a second video panel of the plurality of synchronized video panels. For example, as shown in FIG. 3I and FIG. 3J, detecting gesture 412 transitions display in first region 408 from panel 388 to panel 390. In some embodiments, in response to detecting a fourth gesture on the touch screen display, displaying (528) in the first region of the user interface, one or more still images (e.g., detecting gesture 432 in FIG. 3L and displaying image 434 in FIG. 3M).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, the term personal trainer is not limited to an individual that is a certified personal trainer. The expression personal trainer includes, but is not limited to a certified personal trainer, sports coach, fitness coach, group fitness instructor, health and fitness specialist, health expert, nutritional coach, life coach, health counselor, wellness practitioner, holistic health practitioner, health guide, celebrity, celebrity fitness expert, celebrity trainer, professional athlete, amateur or semi-professional athlete, wellness mentor, dance coach, dance instructor, yoga teacher, Pilates teacher and general fitness enthusiast. The expression "personal training services" is not limited to instruction from a personal trainer. The expression personal training services includes, but is not limited to instruction, advice and guidance for nutrition and diet, aerobics, mental health, emotional health, sports technique, postural modification, endurance, flexibility, yoga, meditation, Pilates, weight training, strength training, balance, calisthenics and pliometrics.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for providing personal training services, at a portable electronic device having a touch screen, comprising:
   providing a user interface comprising a first region and a second region, wherein the first region is configured to be capable of providing moving videos of a selected exercise among a plurality of exercises in a program, and the second region is configured to be capable of displaying a timer for providing time information during the selected exercise and a visual representation of a next exercise to follow the selected exercise;
   providing, in the first region of the user interface, a plurality of panels simultaneously providing synchronized moving videos of different perspective views of a trainer performing the selected exercise and an active panel indicator indicating a number of the plurality of panels, the plurality of panels including a mixed-view panel configured to switch between providing of at least some of the different perspective views of the trainer performing the selected exercise;
   displaying, in the second region, the timer and the visual representation of the next exercise during the selected exercise, the visual representation of the next exercise including a still image of the next exercise followed by a video segment of the next exercise based on progression of the selected exercise;
   conveying audible information in synchronicity with the timer and the synchronized moving videos; and
   in response to detecting a first gesture on the touch screen to select one of the panels, while providing the synchronized moving videos:
      providing, in the first region of the user interface, a zoomed-in view of the selected panel; and
      modifying the active panel indicator to indicate the zoomed-in viewing of the selected panel.

2. The method of claim 1, further comprising:
   in response to detecting a second gesture on the touch screen, while providing the zoomed-in view of the selected panel:
      providing, in the first region of the user interface, the synchronized moving videos.

3. The method of claim 2, wherein the first gesture and the second gesture are of the same type of gesture.

4. The method of claim 1, wherein each moving video provided by the respective panel of the plurality of panels includes a motion of the trainer when the trainer is moving and a posture of the trainer when the trainer is approximately stationary.

5. The method of claim 4, wherein the trainer is a personal trainer.

6. The method of claim 5, wherein the audible information comprises verbal communication from the personal trainer.

7. The method of claim 1, wherein the audible information comprises cues or tones.

8. The method of claim 1, further comprising:
   in response to detecting a third gesture on the touch screen, while providing the zoomed-in view of the selected panel:
      providing, in the first region of the user interface, a zoomed-in view of another one of the plurality of panels.

9. The method of claim 1, wherein the progression of the timer in the second region of the user interface remains consistent while view of the first region of the user interface changes.

10. The method of claim 1, further comprising:
    in response to detecting a fourth gesture on the touch screen:
       providing, in the first region of the user interface, one or more still images.

11. A portable electronic device, comprising:
    a touch screen;
    one or more processors;
    memory; and
    one or more programs, wherein the one or more programs are stored in the memory and configured to be executed by the one or more processors, the one or more programs including instructions for:
       providing a user interface comprising a first region and a second region, wherein the first region is configured to be capable of providing moving videos of a selected exercise among a plurality of exercises in a program, and the second region is configured to be capable of displaying a timer for providing time information during the selected exercise and a visual representation of a next exercise to follow the selected exercise;
       providing, in the first region of the user interface, a plurality of panels simultaneously providing synchronized moving videos of different perspective views of a trainer performing the selected exercise and an active panel indicator indicating a number of the plurality of panels, the plurality of panels including a mixed-view panel configured to switch between providing of at least some of the different perspective views of the trainer performing the selected exercise;
       displaying, in the second region, the timer and the visual representation of the next exercise during the selected exercise, the visual representation of the next exercise including a still image of the next exercise followed by a video segment of the next exercise based on progression of the selected exercise;
       conveying audible information in synchronicity with the timer and the synchronized moving videos; and
       in response to detecting a first gesture on the touch screen to select one of the panels, while providing the synchronized moving videos:
          providing, in the first region of the user interface, a zoomed-in view of the selected panel; and
          modifying the active panel indicator to indicate the zoomed-in viewing of the selected panel.

12. The portable electronic device of claim 11, comprising one or more programs including instructions for:
in response to detecting a second gesture on the touch screen, while providing the zoomed-in view of the selected panel:
providing, in the first region of the user interface, the synchronized moving videos.

13. The portable electronic device of claim 12, wherein the first gesture and the second gesture are of the same type of gesture.

14. The portable electronic device of claim 11, wherein each moving video provided by the respective panel of the plurality of panels includes a motion of the trainer when the trainer is moving and a posture of the trainer when the trainer is approximately stationary.

15. The portable electronic device of claim 14, wherein the trainer is a personal trainer.

16. The portable electronic device of claim 15, wherein the audible information comprises verbal communication from the personal trainer.

17. The portable electronic device of claim 11, wherein the audible information comprises cues or tones.

18. The portable electronic device of claim 11, comprising one or more programs including instructions for:
in response to detecting a third gesture on the touch screen, while providing the zoomed-in view of the selected panel:
providing, in the first region of the user interface, a zoomed-in view of another one of the plurality of panels.

19. The portable electronic device of claim 11, wherein the progression of the timer in the second region of the user interface remains consistent while view of the first region of the user interface changes.

20. A non-transitory computer readable storage medium having stored therein instructions, which when executed by a device with a touch screen, cause the device to:
provide a user interface comprising a first region and a second region, wherein the first region is configured to be capable of providing moving videos of a selected exercise among a plurality of exercises in a program, and the second region is configured to be capable of displaying a timer for providing time information during the selected exercise and a visual representation of a next exercise to follow the selected exercise;
provide, in the first region of the user interface, a plurality of panels simultaneously providing synchronized moving videos of different perspective views of a trainer performing the selected exercise and an active panel indicator indicating a number of the plurality of panels, the plurality of panels including a mixed-view panel configured to switch between providing of at least some of the different perspective views of the trainer performing the selected exercise;
display, in the second region, the timer and the visual representation of the next exercise during the selected exercise, the visual representation of the next exercise including a still image of the next exercise followed by a video segment of the next exercise based on progression of the selected exercise;
convey audible information in synchronicity with the timer and the synchronized moving videos; and
in response to detecting a first gesture on the touch screen to select one of the panels, while providing the synchronized moving videos:
provide, in the first region of the user interface, a zoomed-in view of the selected panel; and
modify the active panel indicator to indicate the zoomed-in view of the selected panel.

21. The non-transitory computer readable storage medium of claim 20, comprising instructions, which when executed by a device with a touch screen, cause the device to:
in response to detecting a second gesture on the touch screen, while providing the zoomed-in view of the selected panel:
provide, in the first region of the user interface, the synchronized moving videos.

22. The non-transitory computer readable storage medium of claim 21, wherein the first gesture and the second gesture are of the same type of gesture.

23. The non-transitory computer readable storage medium of claim 20, wherein each moving video provided by the respective panel of the plurality of panels includes a motion and a posture of the trainer.

24. The non-transitory computer readable storage medium of claim 23, wherein the trainer is a personal trainer.

25. The non-transitory computer readable storage medium of claim 24, wherein the audible information comprises verbal communication from the personal trainer.

26. The non-transitory computer readable storage medium of claim 20, wherein the audible information comprises cues or tones.

27. The non-transitory computer readable storage medium of claim 20, comprising instructions, which when executed by a device with a touch screen, cause the device to:
in response to detecting a third gesture on the touch screen, while providing the zoomed-in view of the selected panel:
provide, in the first region of the user interface, a zoomed-in view of another one of the plurality of panels.

28. The non-transitory computer readable storage medium of claim 20, wherein the progression of the timer in the second region of the user interface remains consistent while view of the first region of the user interface changes.

29. A graphical user interface on an electronic device with a touch screen, a memory, and one or more processors to execute one or more programs stored in the memory, the graphical user interface comprising:
a first user interface comprising a first region and a second region, wherein the first region is configured to be capable of providing moving videos of a selected exercise among a plurality of exercises in a program, and the second region is configured to be capable of displaying a timer for providing time information during the selected exercise and a visual representation of a next exercise to follow the selected exercise;
the graphical user interface configured to provide, in the first region of the first user interface, a plurality of panels simultaneously providing synchronized moving videos of different perspective views of a trainer performing the selected exercise and an active panel indicator indicating a number of the plurality of panels, the plurality of panels including a mixed-view panel configured to switch between providing of at least some of the different perspective views of the trainer performing the selected exercise;
the graphical user interface configured to provide, in the second region, the timer and the visual representation of the next exercise during the selected exercise, the visual representation of the next exercise including a still image of the next exercise followed by a video segment of the next exercise based on progression of the selected exercise;

the graphical user interface configured to convey audible information in synchronicity with the timer and the synchronized moving videos; and the graphical user interface configured to provide, in the first region of the first user interface, a zoomed-in view of a selected panel, in response to detecting a first gesture on the touch screen, while providing the synchronized moving videos; and the graphical user interface configured to modify the active panel indicator to indicate the zoomed-in view of the selected panel, in response to detecting the first gesture on the touch screen, while providing the synchronized moving videos.

\* \* \* \* \*